US012621246B2

(12) United States Patent
Ma et al.

(10) Patent No.: US 12,621,246 B2
(45) Date of Patent: May 5, 2026

(54) RENDERING AND DISPLAYING DATA

(71) Applicant: QUALCOMM Incorporated, San Diego, CA (US)

(72) Inventors: Liangping Ma, San Diego, CA (US); Nikolai Konrad Leung, San Francisco, CA (US); Thomas Stockhammer, Bergen (DE); Imed Bouazizi, Frisco, TX (US)

(73) Assignee: QUALCOMM Incorporated, San Diego, CA (US)

( * ) Notice: Subject to any disclaimer, the term of this patent is extended or adjusted under 35 U.S.C. 154(b) by 24 days.

(21) Appl. No.: 18/402,562

(22) Filed: Jan. 2, 2024

(65) Prior Publication Data

US 2025/0219959 A1 Jul. 3, 2025

(51) Int. Cl.
| | |
|---|---|
| *G06F 15/173* | (2006.01) |
| *G06T 7/70* | (2017.01) |
| *H04L 47/10* | (2022.01) |
| *H04L 47/283* | (2022.01) |

(52) U.S. Cl.
CPC .............. *H04L 47/283* (2013.01); *G06T 7/70* (2017.01); *H04L 47/29* (2013.01)

(58) Field of Classification Search
CPC ............................... H04L 47/29; H04L 47/283
See application file for complete search history.

(56) References Cited

U.S. PATENT DOCUMENTS

| | | | | |
|---|---|---|---|---|
| 12,254,595 B2 * | 3/2025 | Price | ...................... | G06V 10/62 |
| 2007/0091922 A1 * | 4/2007 | Elliot | ...................... | H04L 47/12 370/468 |
| 2013/0227062 A1 * | 8/2013 | Lee | ...................... | H04L 65/762 709/217 |
| 2013/0314439 A1 * | 11/2013 | Ota | ...................... | G06F 3/14 345/629 |
| 2017/0213388 A1 * | 7/2017 | Margolis | ................. | G06T 13/00 |
| 2018/0091791 A1 * | 3/2018 | Jiang | ..................... | H04N 13/388 |
| 2019/0045213 A1 * | 2/2019 | Raut | ...................... | H04N 19/17 |

* cited by examiner

*Primary Examiner* — Yves Dalencourt
(74) *Attorney, Agent, or Firm* — Polsinelli LLP/QUALCOMM Incorporated

(57) ABSTRACT

Systems and techniques are described herein for wireless communication. For instance, a method for wireless communication is provided. The method may include determining a first predicted pose of the device, the first predicted pose corresponding to a first time instance; transmitting, to a server, a request to process first data based on the first predicted pose; determining a change in a communication characteristic between the device and the server; and transmitting, to the server, in response to the change in the communication characteristic, a request to cease processing the first data.

27 Claims, 11 Drawing Sheets

Figure 4:
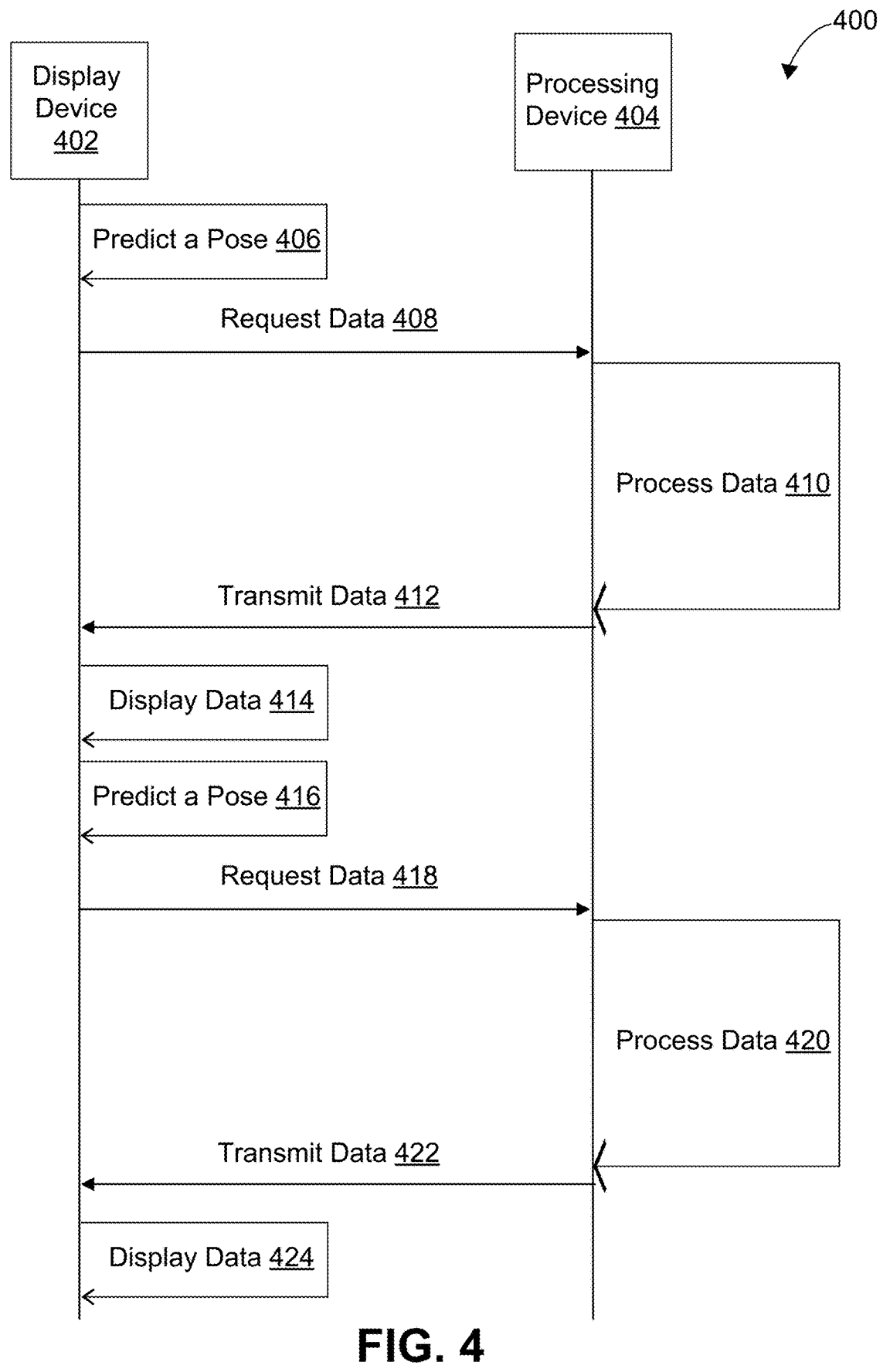

400

Display Device 402

Processing Device 404

Predict a Pose 406

Request Data 408

Process Data 410

Transmit Data 412

Display Data 414

Predict a Pose 416

Request Data 418

Process Data 420

Transmit Data 422

Display Data 424

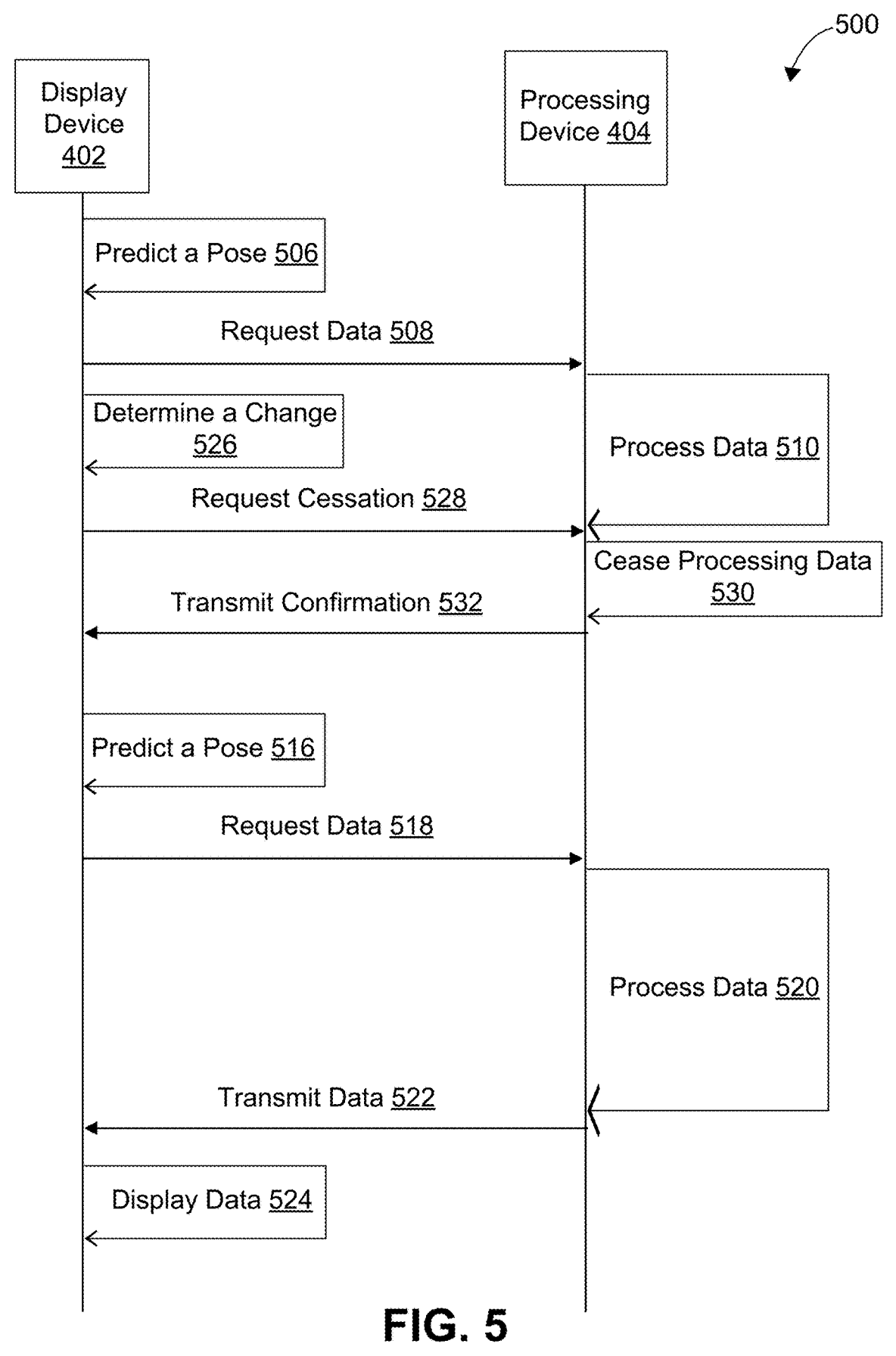

Display Device 402

Processing Device 404

Predict a Pose 506

Request Data 508

Determine a Change 526

Process Data 510

Request Cessation 528

Cease Processing Data 530

Transmit Confirmation 532

Predict a Pose 516

Request Data 518

Process Data 520

Transmit Data 522

Display Data 524

FIG. 5

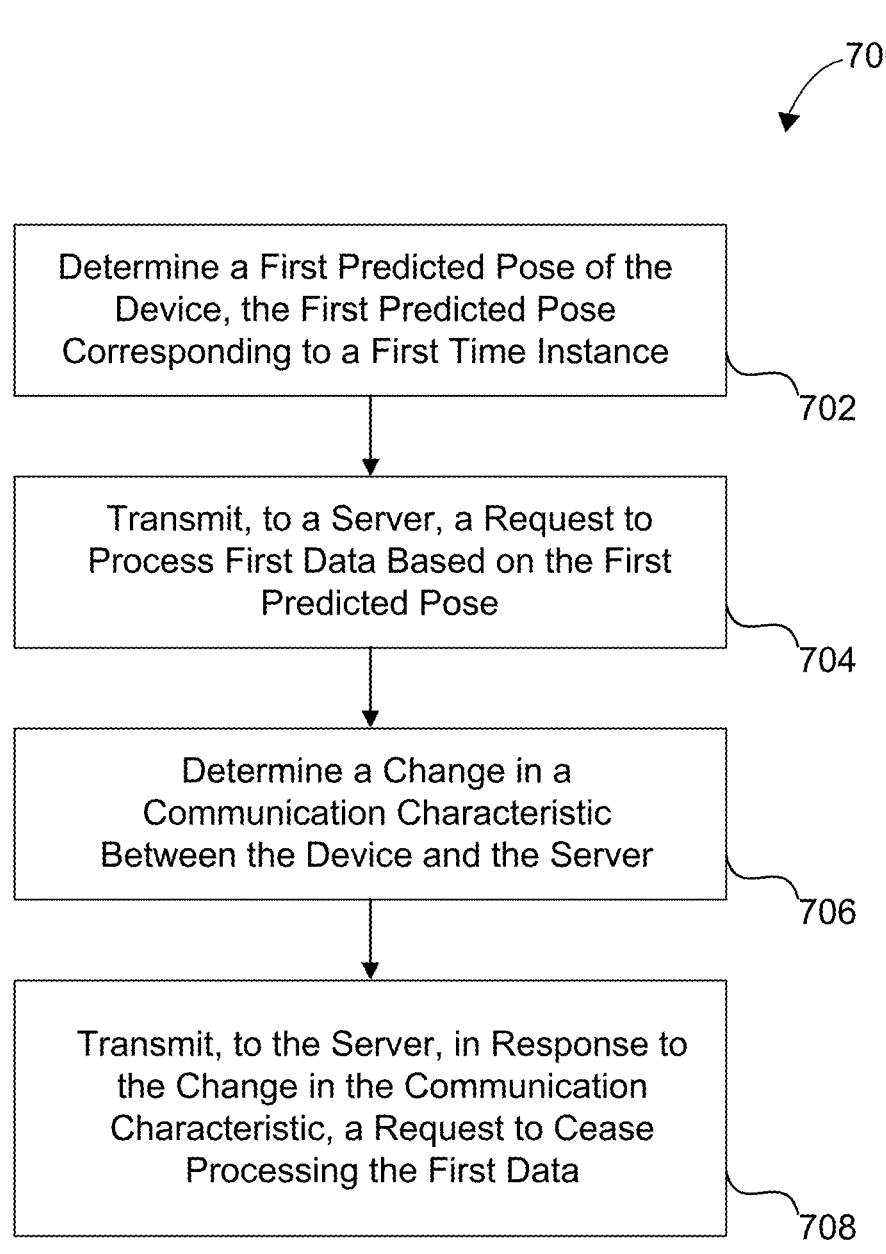

700

Determine a First Predicted Pose of the Device, the First Predicted Pose Corresponding to a First Time Instance

702

Transmit, to a Server, a Request to Process First Data Based on the First Predicted Pose

704

Determine a Change in a Communication Characteristic Between the Device and the Server

706

Transmit, to the Server, in Response to the Change in the Communication Characteristic, a Request to Cease Processing the First Data

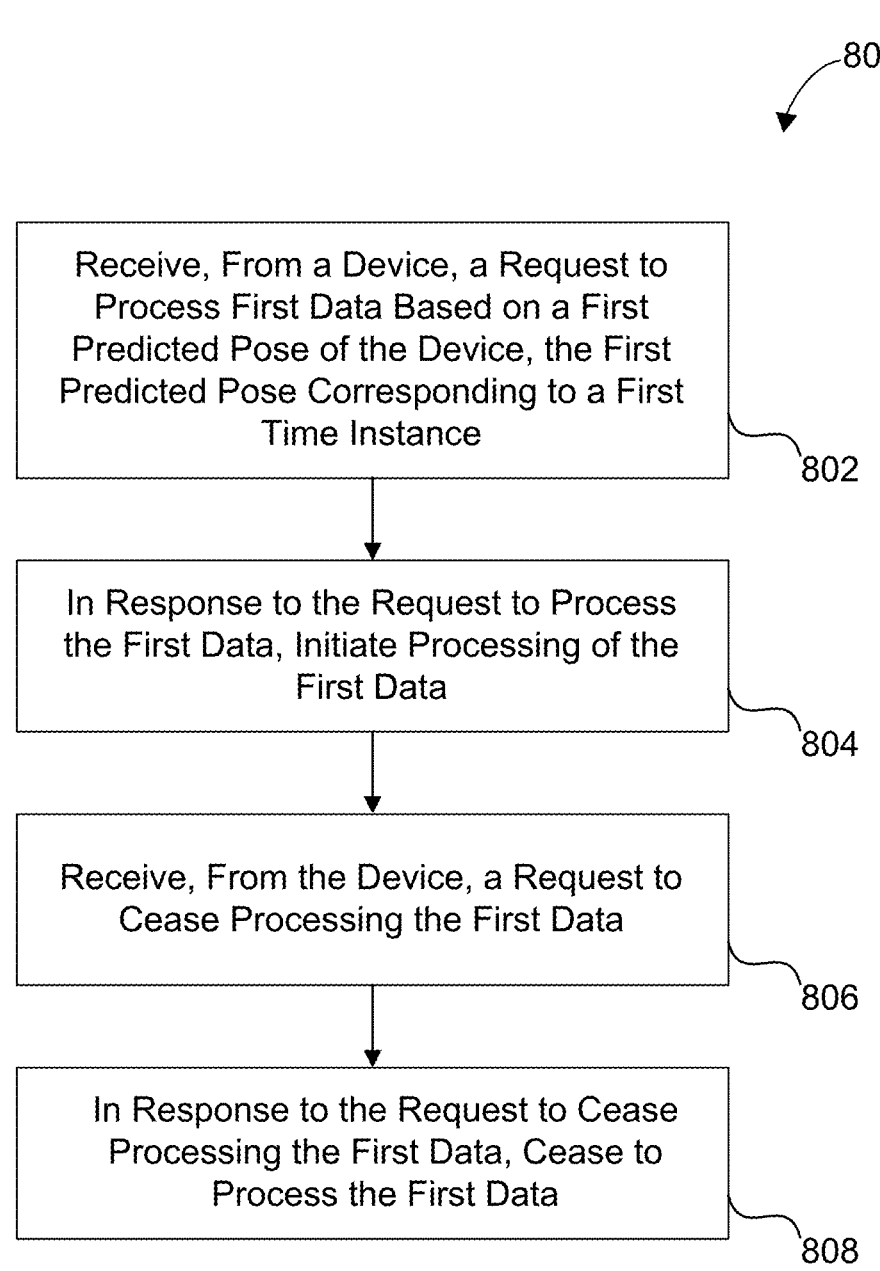

800

Receive, From a Device, a Request to Process First Data Based on a First Predicted Pose of the Device, the First Predicted Pose Corresponding to a First Time Instance

802

In Response to the Request to Process the First Data, Initiate Processing of the First Data

804

Receive, From the Device, a Request to Cease Processing the First Data

806

In Response to the Request to Cease Processing the First Data, Cease to Process the First Data

RENDERING AND DISPLAYING DATA

TECHNICAL FIELD

The present disclosure generally relates to rendering and displaying data. For example, aspects of the present disclosure include systems and techniques for ceasing or canceling the rendering and/or display of data.

BACKGROUND

Some extended reality (XR) (including virtual reality (VR), augmented reality (AR), mixed reality (MR), etc.) generate data to be displayed at one device and display the data at a separate device. For example, an XR system may include a display component and a computing component. The computing component may render data and communicate the data to the display component and the display component may display the data.

SUMMARY

The following presents a simplified summary relating to one or more aspects disclosed herein. Thus, the following summary should not be considered an extensive overview relating to all contemplated aspects, nor should the following summary be considered to identify key or critical elements relating to all contemplated aspects or to delineate the scope associated with any particular aspect. Accordingly, the following summary presents certain concepts relating to one or more aspects relating to the mechanisms disclosed herein in a simplified form to precede the detailed description presented below.

Systems and techniques are described for wireless communication. According to at least one example, a method is provided for wireless communication. The method includes: determining a first predicted pose of the device, the first predicted pose corresponding to a first time instance; transmitting, to a server, a request to process first data based on the first predicted pose; determining a change in a communication characteristic between the device and the server; and transmitting, to the server, in response to the change in the communication characteristic, a request to cease processing the first data.

In another example, an apparatus for wireless communication is provided that includes at least one memory and at least one processor (e.g., configured in circuitry) coupled to the at least one memory. The at least one processor configured to: determine a first predicted pose of the device, the first predicted pose corresponding to a first time instance; cause at least one transmitter to transmit, to a server, a request to process first data based on the first predicted pose; determine a change in a communication characteristic between the device and the server; and cause the at least one transmitter to transmit, to the server, in response to the change in the communication characteristic, a request to cease processing the first data.

In another example, a non-transitory computer-readable medium is provided that has stored thereon instructions that, when executed by one or more processors, cause the one or more processors to: determine a first predicted pose of the device, the first predicted pose corresponding to a first time instance; cause at least one transmitter to transmit, to a server, a request to process first data based on the first predicted pose; determine a change in a communication characteristic between the device and the server; and cause the at least one transmitter to transmit, to the server, in response to the change in the communication characteristic, a request to cease processing the first data.

In another example, an apparatus for wireless communication is provided. The apparatus includes: means for determining a first predicted pose of the device, the first predicted pose corresponding to a first time instance; means for transmitting, to a server, a request to process first data based on the first predicted pose; means for determining a change in a communication characteristic between the device and the server; and means for transmitting, to the server, in response to the change in the communication characteristic, a request to cease processing the first data.

In another example, a method is provided for processing data at a server. The method includes: receiving, from a device, a request to process first data based on a first predicted pose of the device, the first predicted pose corresponding to a first time instance; in response to the request to process the first data, initiating processing of the first data; receiving, from the device, a request to cease processing the first data; and in response to the request to cease processing the first data, ceasing to process the first data.

In another example, an apparatus for processing data at a server is provided that includes at least one memory and at least one processor (e.g., configured in circuitry) coupled to the at least one memory. The at least one processor configured to: receive, from a device, a request to process first data based on a first predicted pose of the device, the first predicted pose corresponding to a first time instance; in response to the request to process the first data, initiate processing of the first data; receive, from the device, a request to cease processing the first data; and in response to the request to cease processing the first data, cease processing the first data.

In another example, a non-transitory computer-readable medium is provided that has stored thereon instructions that, when executed by one or more processors, cause the one or more processors to: receive, from a device, a request to process first data based on a first predicted pose of the device, the first predicted pose corresponding to a first time instance; in response to the request to process the first data, initiate processing of the first data; receive, from the device, a request to cease processing the first data; and in response to the request to cease processing the first data, cease processing the first data.

In another example, an apparatus for processing data at a server is provided. The apparatus includes: means for receiving, from a device, a request to process first data based on a first predicted pose of the device, the first predicted pose corresponding to a first time instance; means for, in response to the request to process the first data, initiating processing of the first data; means for receiving, from the device, a request to cease processing the first data; and means for, in response to the request to cease processing the first data, ceasing to process the first data.

In another example, a method is provided for wireless communication. The method includes: determining a first predicted pose of the device, the first predicted pose corresponding to a first time; transmitting, to a server, a request to process first data based on the first predicted pose; determining a change in a communication characteristic between the device and the server; and transmitting, to the server, in response to the determined change in the communication characteristic, a request to revise how to process data at the server.

In another example, an apparatus for wireless communication is provided that includes at least one memory and at least one processor (e.g., configured in circuitry) coupled to the at least one memory. The at least one processor configured to: determine a first predicted pose of the device, the first predicted pose corresponding to a first time; cause at least one transmitter to transmit, to a server, a request to process first data based on the first predicted pose; determine a change in a communication characteristic between the device and the server; and cause the at least one transmitter to transmit, to the server, in response to the determined change in the communication characteristic, a request to revise how to process data at the server.

In another example, a non-transitory computer-readable medium is provided that has stored thereon instructions that, when executed by one or more processors, cause the one or more processors to: determine a first predicted pose of the device, the first predicted pose corresponding to a first time; cause at least one transmitter to transmit, to a server, a request to process first data based on the first predicted pose; determine a change in a communication characteristic between the device and the server; and cause the at least one transmitter to transmit, to the server, in response to the determined change in the communication characteristic, a request to revise how to process data at the server.

In another example, an apparatus for wireless communication is provided. The apparatus includes: means for determining a first predicted pose of the device, the first predicted pose corresponding to a first time; means for transmitting, to a server, a request to process first data based on the first predicted pose; means for determining a change in a communication characteristic between the device and the server; and means for transmitting, to the server, in response to the determined change in the communication characteristic, a request to revise how to process data at the server.

In another example, a method is provided for processing data at a server. The method includes: receiving, from a device, a request to process first data based on a first predicted pose of the device, the first predicted pose corresponding to a first time; in response to the request to process the first data, initiating processing of the first data; receiving, from the device, a request to revise how to process data; in response to the request to revise how to process data, determining whether processing of the first data is ongoing; and in response to determining that the processing of the first data is ongoing, ceasing to process the first data.

In another example, an apparatus for processing data at a server is provided that includes at least one memory and at least one processor (e.g., configured in circuitry) coupled to the at least one memory. The at least one processor configured to: receive, from a device, a request to process first data based on a first predicted pose of the device, the first predicted pose corresponding to a first time; in response to the request to process the first data, initiate processing of the first data; receive, from the device, a request to revise how to process data; in response to the request to revise how to process data, determine whether processing of the first data is ongoing; and in response to determining that the processing of the first data is ongoing, cease processing of the first data.

In another example, a non-transitory computer-readable medium is provided that has stored thereon instructions that, when executed by one or more processors, cause the one or more processors to: receive, from a device, a request to process first data based on a first predicted pose of the device, the first predicted pose corresponding to a first time; in response to the request to process the first data, initiate processing of the first data; receive, from the device, a request to revise how to process data; in response to the request to revise how to process data, determine whether processing of the first data is ongoing; and in response to determining that the processing of the first data is ongoing, cease processing of the first data.

In another example, an apparatus for processing data at a server is provided. The apparatus includes: means for receiving, from a device, a request to process first data based on a first predicted pose of the device, the first predicted pose corresponding to a first time; means for, in response to the request to process the first data, initiating processing of the first data; means for receiving, from the device, a request to revise how to process data; means for, in response to the request to revise how to process data, determining whether processing of the first data is ongoing; and means for, in response to determining that the processing of the first data is ongoing, ceasing to process the first data.

In some aspects, one or more of the apparatuses described herein is, can be part of, or can include an extended reality device (e.g., a virtual reality (VR) device, an augmented reality (AR) device, or a mixed reality (MR) device), a vehicle (or a computing device, system, or component of a vehicle), a mobile device (e.g., a mobile telephone or so-called "smart phone", a tablet computer, or other type of mobile device), a smart or connected device (e.g., an Internet-of-Things (IoT) device), a wearable device, a personal computer, a laptop computer, a video server, a television (e.g., a network-connected television), a robotics device or system, or other device. In some aspects, each apparatus can include an image sensor (e.g., a camera) or multiple image sensors (e.g., multiple cameras) for capturing one or more images. In some aspects, each apparatus can include one or more displays for displaying one or more images, notifications, and/or other displayable data. In some aspects, each apparatus can include one or more speakers, one or more light-emitting devices, and/or one or more microphones. In some aspects, each apparatus can include one or more sensors. In some cases, the one or more sensors can be used for determining a location of the apparatuses, a state of the apparatuses (e.g., a tracking state, an operating state, a temperature, a humidity level, and/or other state), and/or for other purposes.

This summary is not intended to identify key or essential features of the claimed subject matter, nor is it intended to be used in isolation to determine the scope of the claimed subject matter. The subject matter should be understood by reference to appropriate portions of the entire specification of this patent, any or all drawings, and each claim.

The foregoing, together with other features and aspects, will become more apparent upon referring to the following specification, claims, and accompanying drawings.

BRIEF DESCRIPTION OF THE DRAWINGS

Illustrative examples of the present application are described in detail below with reference to the following figures:

FIG. 4 is a communication flow diagram illustrating an example process for processing data and displaying data, according to various aspects of the present disclosure;

FIG. 5 is a communication flow diagram illustrating another example process for processing data and displaying data, according to various aspects of the present disclosure;

FIG. 7 is a flow diagram illustrating an example process for wireless communication at a device, in accordance with aspects of the present disclosure;

FIG. 8 is a flow diagram illustrating an example process for processing data at a server, in accordance with aspects of the present disclosure;

DETAILED DESCRIPTION

Figure 1:
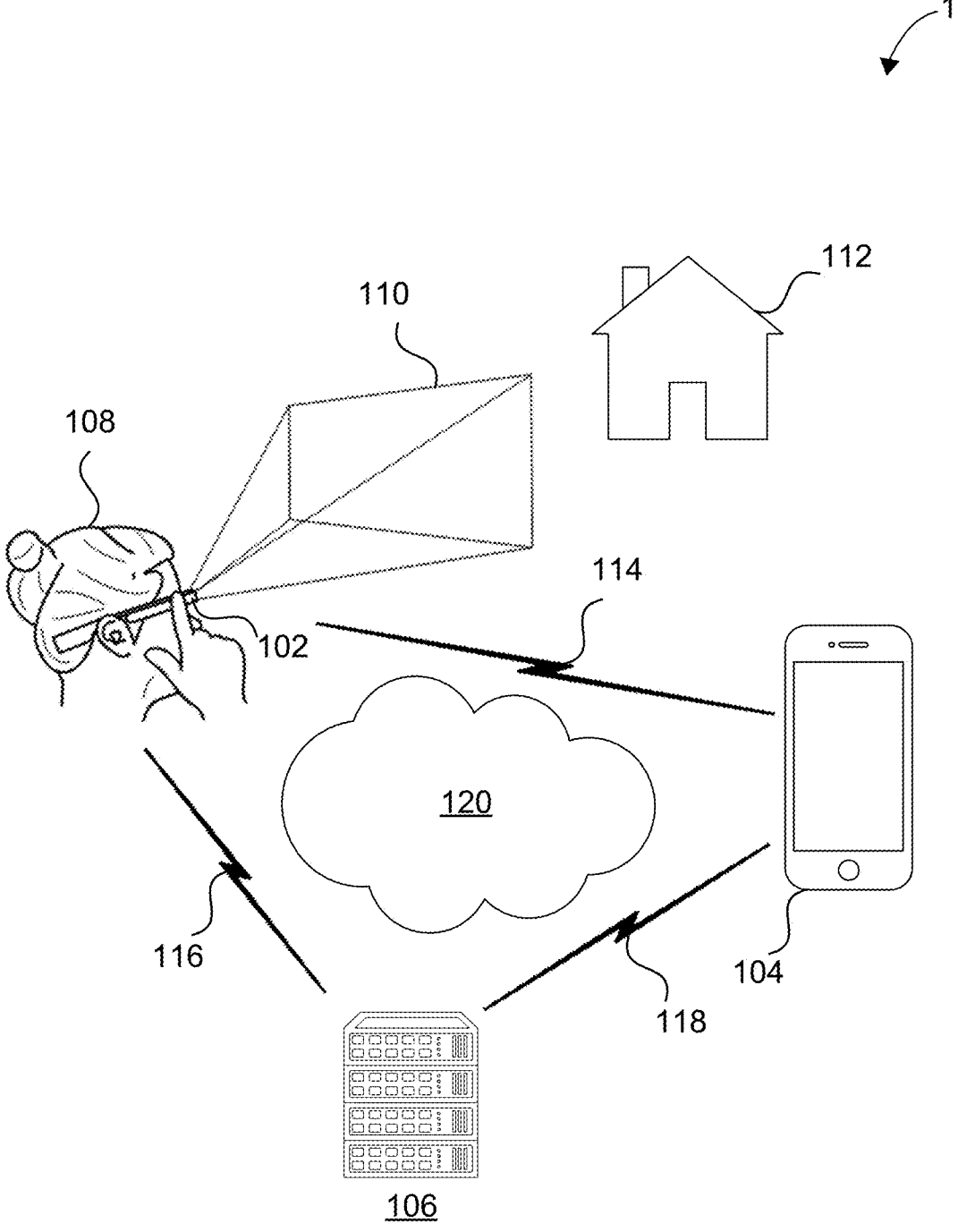
FIG. 1 is a diagram illustrating an example of an extended reality (XR) system, according to various aspects of the present disclosure.

Certain aspects of this disclosure are provided below. Some of these aspects may be applied independently and some of them may be applied in combination as would be apparent to those of skill in the art. In the following description, for the purposes of explanation, specific details are set forth in order to provide a thorough understanding of aspects of the application. However, it will be apparent that various aspects may be practiced without these specific details. The figures and description are not intended to be restrictive.

The ensuing description provides example aspects only, and is not intended to limit the scope, applicability, or configuration of the disclosure. Rather, the ensuing description of the exemplary aspects will provide those skilled in the art with an enabling description for implementing an exemplary aspect. It should be understood that various changes may be made in the function and arrangement of elements without departing from the spirit and scope of the application as set forth in the appended claims.

The terms "exemplary" and/or "example" are used herein to mean "serving as an example, instance, or illustration." Any aspect described herein as "exemplary" and/or "example" is not necessarily to be construed as preferred or advantageous over other aspects. Likewise, the term "aspects of the disclosure" does not require that all aspects of the disclosure include the discussed feature, advantage, or mode of operation.

Various types of devices can be used to render and display data, such as mobile devices (e.g., mobile phones), extended reality (XR) devices or systems, wearable devices (e.g., a network-connected watch), among others. XR devices or systems can include virtual reality (VR) systems facilitating interactions with VR environments, augmented reality (AR) systems facilitating interactions with AR environments, mixed reality (MR) systems facilitating interactions with MR environments, and/or other XR systems. VR technology provides a complete immersive experience in a three-dimensional (3D) computer-generated VR environment or video depicting a virtual version of a real-world environment. VR content can include VR video in some cases, which can be captured and rendered at very high quality, potentially providing a truly immersive virtual reality experience. Virtual reality applications can include gaming, training, education, sports video, online shopping, among others. VR content can be rendered and displayed using a VR system or device, such as a VR HMD or other VR headset, which fully covers a user's eyes during a VR experience.

AR is a technology that provides virtual or computer-generated content (referred to as AR content) over the user's view of a physical, real-world scene or environment. AR content can include any virtual content, such as text, video, images, graphic content, location data (e.g., global positioning system (GPS) data or other location data), sounds, any combination thereof, and/or other augmented content. An AR system is designed to enhance (or augment), rather than to replace, a person's current perception of reality. For example, a user can see a real stationary or moving physical object through an AR device display, but the user's visual perception of the physical object may be augmented or enhanced by a virtual image of that object (e.g., a real-world car replaced by a virtual image of a DeLorean), by AR content added to the physical object (e.g., virtual wings added to a real-world pig), by AR content displayed relative to the physical object (e.g., informational virtual content displayed near a sign on a building, a virtual monster anchored to (e.g., placed on top of) a real-world table in one or more images, etc.), and/or by displaying other types of AR content. Various types of AR systems can be used for gaming, entertainment, and/or other applications.

MR technologies can combine aspects of VR and AR to provide an immersive experience for a user. For example, in an MR environment, real-world and computer-generated objects can interact (e.g., a real person can interact with a virtual person as if the virtual person were a real person). Additionally, or alternatively, MR can include a VR headset with AR capabilities, for instance, an MR system may perform video pass-through (to mimic AR glasses) by passing images (and/or video) of some real-world objects, like a keyboard and/or a monitor, and/or taking real-word geometry (e.g., walls, tables) into account. For example, in a game, the structure of a room can be retextured to according to the game, but the geometry may still be based on the real-world geometry of the room.

In some cases, an XR system can include an optical "see-through" display (e.g., see-through AR HMD or AR glasses), allowing the XR system to display XR content (e.g., AR content) into a field of view of the user between the user and the user's environment. For example, a user may view physical objects through a display (e.g., glasses or lenses), and the AR system can display AR content onto the display to provide the user with an enhanced visual perception of one or more real-world objects. In one example, a display of an optical see-through AR system can include a lens or glass in front of each eye (or a single lens or glass over both eyes). The see-through display can allow the user to see a real-world or physical object directly, and can display (e.g., projected or otherwise displayed) an enhanced image of that object or additional AR content to augment the user's visual perception of the real world.

In some cases, an XR system can include a "pass-through" display (e.g., a pass-through AR HMD). The XR system may include a camera that may capture images or video of the user's environment and display the captured images or video at the display. The XR system may further augment the displayed images or video with virtual content.

An XR system may display visual information (e.g., text, images, and/or video) at a display partially, mostly, or entirely, filling a user's field of view (e.g., using a see-through or pass-through display). XR systems typically include a display (e.g., a head-mounted display (HMD) or smart glasses), an image-capture device proximate to the display, and a processing device. In such XR systems, the image-capture device may capture images indicative of a field of view of user, the processing device may determine, or obtain, visual information to display based on the field of view of the user and/or objects within the field of view, and the display may display the virtual content within the field of view of the user.

In XR systems, data for display may be rendered based on a pose (e.g., position and/or or orientation) of the display. For example, in AR and/or MR use cases, as the user moves and/or reorients the display, in order for the data displayed at the display to match the scene (as viewed by the user through the display either in a see-through or pass-through configuration), the data should be rendered according to the movement and/or reorientation of the display. Similarly, in a VR use case, the user moving and/or reorienting the display may be interpreted as an instruction to change a view of the user of the virtual environment of the user. In any case, XR systems may render data to be displayed based on a pose of the display.

Some XR systems (e.g., split-rendering XR systems) include two or more devices, including a first device that may render data to be displayed and a second device to display the rendered data. A split-rendering XR system may allow the display device (which may be intended to be worn on a head of a user) to be smaller than and/or to consume less power than other XR systems. For example, because the display device may not render the data, the display device may perform fewer computing operations than display devices that also render the data to be displayed. Because the display device performs fewer computing operations, the display device may consume less power and may thus have a longer battery life or may require a smaller battery while allowing the same performance as display devices that also render data.

The process of rendering and displaying data in a split-rendering XR system may include a display device of the split-rendering XR system determining a pose of the display device and transmitting an indication of the pose to a processing device of the split-rendering XR system. The processing device may render data based on the pose and transmit the data to the display device. The display device may display the data.

It may take time to communicate the pose from the display device to the processing device. Further, it may take time for processing device to render the data. In some aspects, processing device may encode the data (e.g., according to a video coding standard), which may take time. It may take time for the data to be communicated from processing device to the display device. In cases in which the data was encoded, the display device may decode the data before displaying the data, which may take time. The times used to communicate (e.g., the time for the display device to communicate the pose of the display device to the processing device and the time for the display device to communicate the data to the display device) may be referred to collectively as a "communication delay." The times used to render the data, encode the data, and/or decode the data may be referred to collectively as a "processing delay."

If a display device of a split-rendering XR system determines a current pose of display device, and transmits the current pose of display device to the processing device, and the processing device renders data based on the received pose, by the time the data is ready to be displayed at the display device, the data may no longer match the pose of display device. For example, the display device may move between determining the pose and the time the data based on the determined pose is ready for display at display device based on the communication delay and/or the processing delay.

It may be desirable to synchronize data available for display at the display device with the pose of display device. For example, it may be undesirable to display data that is based on an old pose of a display device. For instance, if a user is turning his or her head, and the data being displayed at display device is based on old poses of display device (based on the communication delay and/or the processing delay), the result may be disorienting or unpleasing to the user. For example, in MR and/or AR use cases, the data may not correlate with the scene and in VR use case, the effect of moving the user's head not being in synch with the view may be disorienting.

In order to cause the data displayed at a display device to match the current pose of the display device, the display device may predict the pose of the display device and provide the predicted pose of the display device to the processing device. The display device may predict the pose of display device based on the communication delay and the processing delay. For example, the display device may provide the processing device with a predicted pose of the display device that corresponds to a time at which the display device expects to be able to display data based on the predicted pose. For instance the pose may be predicted to be a processing delay and a communication delay ahead of the current time.

However, a communication characteristic between the display device and the processing device may change. The change in the communication characteristic may be, or may include, a change in latency (e.g., a change to a round-trip time (RTT) of communications between the display device and the processing device) and/or a change in bandwidth (e.g., a change in a volume of data capable of being exchanged between the display device and the processing device over a duration of time).

A change in the communication characteristic between the display device and the processing device may be the result of a change in how data is routed between the display device and processing device). For example, the display device may communicate with the processing device through one or more intermediary devices, for example, through a network including routers. One example of a change in how data is routed between the display device and the processing device includes a handover. A handover may include the display device switching from communicating with the processing device via a first connection to a first router or cellular base station to a second connection to a second router of cellular base station. The switching procedure in handover may also take time because a device may exchange messages with the old base station and the new base station.

Network congestion may be another cause for a change in the communication characteristic between the display device and the processing device. For example, the network facilitating a communicative connection between the display device and the processing device may experience network congestion and may, as a result, throttle or downgrade the communicative connection between the display device and the processing device. Additionally or alternatively, if the network congestion ceases, the network may increase or upgrade the communicative connection between the display device and the processing device.

Signal quality may be another cause for a change in the communication characteristic between the display device and the processing device. For example, a weak signal (e.g., based on distance) and/or noise between any element of the network between the display device and the processing device (or between the display device and the processing device directly) may result in packets of transmissions being dropped and/or repeated, which may slow communication between the display device and the processing device.

In any event, the communication characteristic between the display device and the processing device may be subject to change. A change in the communication characteristic between the display device and the processing device may result in a change (an increase or a decrease) in the communication delay between the display device and the processing device.

Because the display device may predict the pose of the display device based on the communication delay, a change in the communication delay may cause data rendered by the processing device to be out of synch with the pose of the display device. For example, if the communication delay increases, despite the display device having predicted the pose of the display device, by the time the data arrives at the display device it may be late. As another example, if the communication delay decreases, the data may arrive too early to the display device. The display device may determine to not display data that is too late or too early.

Additionally or alternatively, the change in the communication characteristic may be, or may include, a change in a bandwidth in the communicative connection between the display device and the processing device may change. A change in the bandwidth of between the display device and the processing device may increase or decrease a volume of data that can be communicated between the display device and the processing device during a given duration. For example, initially, based on an initial bandwidth, the processing device may be able to send image data of a first resolution (e.g., including a first number of pixels) to the display device over a duration. As a result of a change in the bandwidth of the communicative connection between the processing device and the display device, at a second time, the processing device may be able to send image data of a second resolution to the display device over the same duration. If the bandwidth decreases, the processing device may not be able to send data of the same quality to the display device fast enough.

For example, the display device may be displaying data from the processing device at a rate of 30 frames per second (fps), or one frame every 33 milliseconds (ms). The bandwidth of the communicative connection between the processing device and the display device may allow the processing device to transmit 1 megabyte per second (MB/s) to the display device. At the 1 MB/s bandwidth, the processing device may be able to transmit a frame of 33 kilobytes (kb) to the display device every 33 ms. However, if the bandwidth decreases, for example, to 0.5 MB/s, and the processing device is still generating frames of 33 kb, the processing device may not be able to transmit the frame to the display device within the 33 ms.

The processing device may adjust (e.g., to generate frames of no more than 16 kb). However, any frames generated between when the bandwidth changes and when the processing device adjusts to account for the change may arrive at the display device too late. The processing device may determine to not display the late data.

It may be a waste of time and/or computing operations for the processing device to render data that the display device will not display (e.g., based on the data being destined to arrive too late or too early to the display device). Further, rendering data that will not be displayed may prevent the processing device from rendering data that may be displayed. For example, the processing device may be capable of processing data for one frame at a time. If the processing device is processing a first frame of data (e.g., a frame that is destined to be too late or too early), the processing device may not be able to begin processing a second frame of data (e.g., of a frame that is based on an updated prediction) until the processing device has finished processing the first frame of data.

Systems, apparatuses, methods (also referred to as processes), and computer-readable media (collectively referred to herein as "systems and techniques") are described herein for rendering and displaying data. The systems and techniques described herein may include a display device and a processing device. The display device may predict poses of the display device and transmit the predicted poses to the processing device. The processing device may process data based on the predicted poses, for example, the processing device may render data for the display device to display based on the predicted poses of the display device. The processing device may transmit the data to the display device and the display device may display the data.

Further, the display device may monitor a communication characteristic between the display device and a processing device. If the display device detects a change in the communication characteristic, the display device may transmit a request to the processing device to cease processing data. The display device may, at the same time and/or with the request, send updated pose information related to an updated pose of the display device (e.g., based on the change to the communication characteristic). In response to receiving the request to cease processing data, the processing device may cease processing the data that is currently being processed. In response to the updated pose information, the processing device may begin processing data based on the updated pose.

The display device may transmit the request to cease processing data based on a change in the communication characteristic between the display device and the processing device that would cause the data to arrive at the display device too early or too late. By ceasing to process data based on the request, the processing device may conserve computing operations by not processing data that is destined to be too early or too late. Further, by ceasing to process data based on the request, the processing device may become available to process data sooner than if the processing device were to complete processing the data that is destined to be too early or too late.

Additionally or alternatively, the display device may send a request to revise how to process data at the processing device. For example, if the display device determines that the change to the communication characteristic is a change to a bandwidth of the communicative connection, the display device may request that the processing device revise how the processing device processes data.

For instance, if the display device determines that the bandwidth has decreased, the display device may request that the processing device decrease a quality of data being produced by the processing device. The request may include a request to cease processing data or not. The processing device may, in response to the request, determine whether the processing device is currently processing data. If the processing device is processing data, the processing device may cease processing the data (whether the request to decrease the quality of data included the request to cease processing data or not). Based on the changed bandwidth, the data being processed may not be transmitted to the display device within the timeframe during which the display device expects the data, thus the data may be destined to be too late. By ceasing to process data that is destined to be too late, the processing device may conserve operations and/or be available to process data sooner.

As another example, if the display device determines that the bandwidth has increased, the display device may request that the processing device increase a quality of data being produced by the processing device. The request may include a request to cease processing data or not. The processing device may, in response to the request, determine whether the processing device is currently processing data. If the processing device is processing data, the processing device may cease processing the data (whether the request to increase the quality of data included the request to cease processing data or not). Increasing the quality of the data being produced by the processing device may increase the size of the data transmitted by the processing device which may increase the bandwidth utilization. By detecting the increased bandwidth and requesting that the processing device increase the quality of the data, the systems and techniques may increase a bandwidth utilization between the processing device and the display device. By ceasing to process data responsive to the request to revise how data is processed, the processing device may spend less time processing data at the lower quality and begin processing data at the higher resolution sooner which may result in the display device receiving higher quality data sooner.

Various aspects of the application will be described with respect to the figures below.

FIG. 1 is a diagram illustrating an example of an extended reality (XR) system 100, according to various aspects of the present disclosure. XR system 100 includes a Display device 102 and may include one or both of a companion device 104 and a server 106. There is a communicative connection 114 between Display device 102 and companion device 104, a communicative connection 116 between Display device 102 and server 106, and a communicative connection 118 between companion device 104 and server 106. Any or all of communicative connection 114, communicative connection 116 and communicative connection 118 may be through a network 120. Network 120 may be a communication network including wireless and/or wired connections. Network 120 may include any number of routers, switches, relays, base stations, etc. (e.g., between Display device 102, companion device 104, and/or server 106). Communicative connection 114, communicative connection 116, communicative connection 118, and/or network 120 may operate according to any number of suitable protocols including, as examples Institute of Electrical and Electronics Engineers (IEEE) 802.11 standards (Wi-Fi), Bluetooth®, fourth generation broadband cellular network standards (4G), fifth generation broadband cellular network standards (5G), Transmission Control Protocol (TCP), User Datagram Protocol (UDP), Internet Protocol (IP), etc.

Display device 102 may implement display, image-capture, view-tracking, display-pose tracking, and/or display-pose prediction aspects of extended reality, including virtual reality (VR), augmented reality (AR), mixed reality (MR), etc. For example, Display device 102 may display virtual content to be viewed by a user 108 in a field of view 110 of user 108. In some cases, Display device 102 may include a transparent surface (e.g., optical glass) such that virtual content may be displayed on (e.g., by being projected onto) the transparent surface to overlay virtual content onto the view of user 108 of environment 112 of user 108 (e.g., in a see-through configuration) (e.g., for AR and/or MR applications). In some cases, Display device 102 may include a camera and may capture images of environment 112. Display device 102 may display the images of environment 112 (as captured by the camera) and virtual content overlaid on the displayed images of the environment (e.g., in a pass-through configuration) (e.g., for AR and/or MR applications). In some cases (e.g., when XR system 100 implements VR), Display device 102 may display virtual content without displaying environment 112 and/or without allowing the user to view environment 112 through Display device 102. In various examples, Display device 102 may be, or may include, a virtual reality headset, smart glasses, a live feed video camera, a GPU, one or more sensors (e.g., such as one or more inertial measurement units (IMUs), image sensors, microphones, etc.), one or more output devices (e.g., such as speakers, display, smart glass, etc.), etc.

Companion device 104 and/or server 106 (individually or collectively) may implement computing aspects of extended reality. For example, companion device 104 and/or server 106 may render the virtual content to be displayed by display device 102. Each of companion device 104 and server 106 may be, or may include, a smartphone, laptop, tablet computer, personal computer, gaming system, a server computer or server device (e.g., an edge or cloud-based server, a personal computer acting as a server device, or a mobile device acting as a server device), any other computing device and/or a combination thereof.

For example, Display device 102 may capture images of environment 112 and/or determine a pose of Display device 102 and provide the images and/or the determined pose to companion device 104 (e.g., via communicative connection 114). Companion device 104 may render virtual content (e.g., related to the captured images of environment 112 and/or based on the provided pose of Display device 102) and provide the virtual content to Display device 102 (e.g., via communicative connection 114). Display device 102 may display the virtual content to user 108 (e.g., within a field of view 110 of user 108).

Additionally or alternatively, Display device 102 may provide the images and/or the determined pose to server 106 (e.g., via communicative connection 116 or via communicative connection 114, companion device 104, and communicative connection 118). Server 106 may render virtual content (e.g., related to the captured images of environment 112 and/or based on the provided pose of Display device 102) and provide the virtual content to Display device 102 (e.g., via communicative connection 116 or via communicative connection 114, companion device 104, and communicative connection 118). Display device 102 may display the virtual content to user 108 (e.g., within field of view 110 of user 108).

Display device 102 may determine a pose of Display device 102 and provide an indication of the pose to companion device 104 and/or server 106. Companion device 104 and/or server 106 may render data (e.g., virtual content) to display at Display device 102 based on the pose and provide the data to Display device 102. Display device 102 may then display the data. It may take time to communicate the pose to companion device 104 and/or server 106. Further, it may take time for companion device 104 and/or server 106 to render the data. In some aspects, companion device 104 and/or server 106 may encode the data (e.g., according to a video coding standard) which may take time. It may take time for the data to be communicated from companion device 104 and/or server 106 to display device 102. In cases in which the data was encoded, display device 102 may decode the data before displaying the data, which may take time.

If display device 102 determines a pose of display device 102, and transmits the pose of display device 102 to companion device 104 and/or server 106, and companion device 104 and/or server 106 renders data based on the pose, by the time the data is ready to be displayed at display device 102, the data may no longer match the pose of display device 102. For example, display device 102 may move between determining the pose and the time the data based on the determined pose is ready for display at display device 102 based on the communication delay and/or the processing delay.

In order to cause the data displayed at display device 102 to match the pose of display device 102, display device 102 may predict the pose of display device 102 and provide the predicted pose of display device 102 to companion device 104 and/or server 106. Display device 102 may predict the pose of display device 102 based on the communication delay and the processing delay. For example, display device 102 may provide companion device 104 and/or server 106 with a predicted pose of display device 102 that corresponds to a time at which display device 102 expects to be able to display data based on the predicted pose (based on the communication delay and/or the processing delay).

Figure 2:
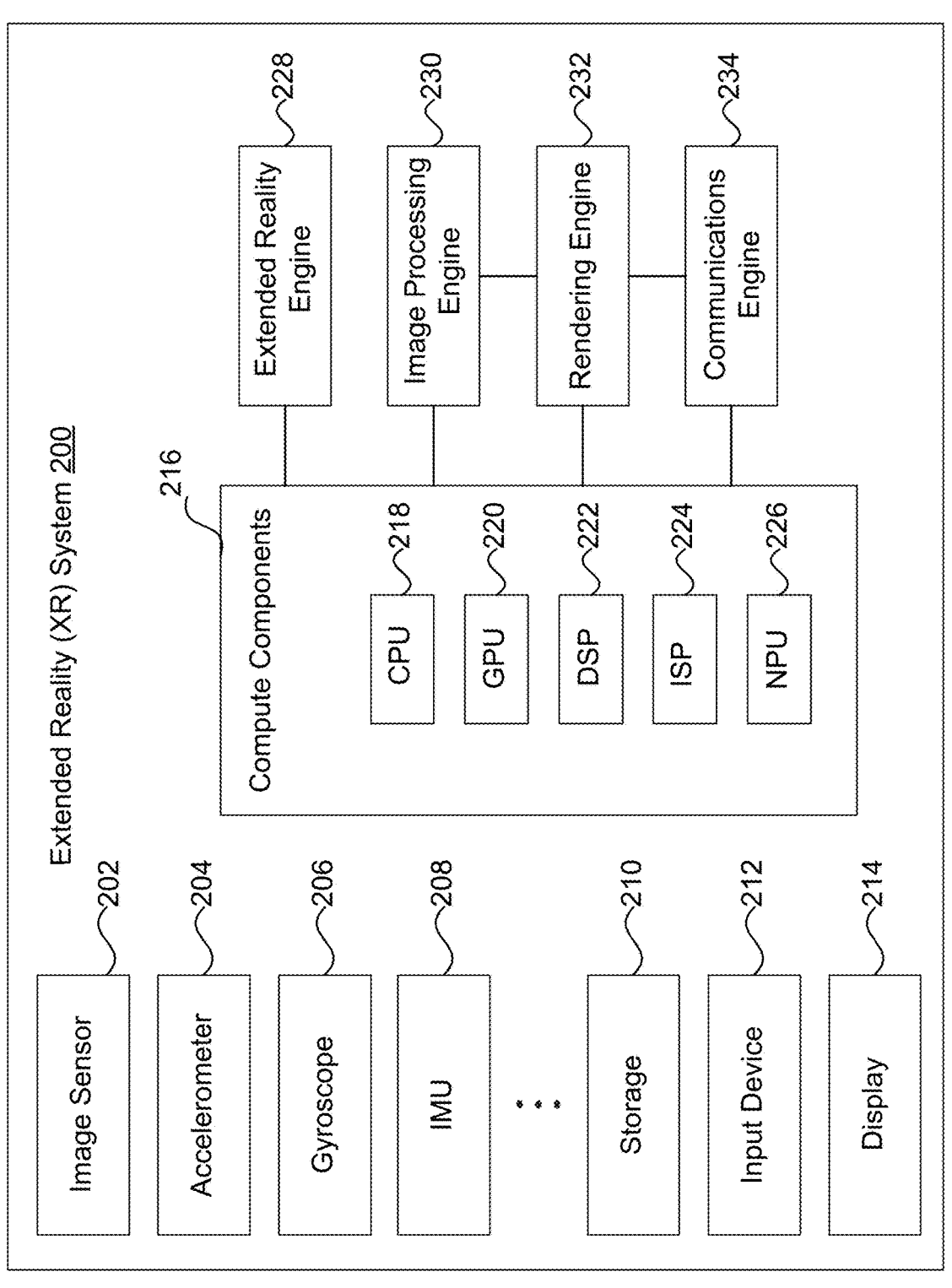
FIG. 2 is a diagram illustrating an architecture of an example extended reality (XR) system, in accordance with some aspects of the disclosure.

FIG. 2 is a diagram illustrating an architecture of an example extended reality (XR) system 200, in accordance with some aspects of the disclosure. XR system 200 may execute XR applications and implement XR operations.

In this illustrative example, XR system 200 includes one or more image sensors 202, an accelerometer 204, a gyroscope 206, an inertial measurement unit IMU 208, a storage 210, an input device 212, a display 214, Compute components 216, an XR engine 228, an image processing engine 230, a rendering engine 232, and a communications engine 234. It should be noted that the components 202-234 shown in FIG. 2 are non-limiting examples provided for illustrative and explanation purposes, and other examples may include more, fewer, or different components than those shown in FIG. 2. For example, in some cases, XR system 200 may include one or more other sensors (e.g., one or more light detection and ranging (LIDAR) sensors, radio detection and ranging (RADAR) sensors, sound detection and ranging (SODAR) sensors, sound navigation and ranging (SONAR) sensors, audio sensors, etc.), one or more display devices, one more other processing engines, one or more other hardware components, and/or one or more other software and/or hardware components that are not shown in FIG. 2. While various components of XR system 200, such as image sensor 202, may be referenced in the singular form herein, it should be understood that XR system 200 may include multiple of any component discussed herein (e.g., multiple image sensors 202).

Display 214 may be, or may include, a glass, a screen, a lens, a projector, and/or other display mechanism that allows a user to see the real-world environment and also allows XR content to be overlaid, overlapped, blended with, or otherwise displayed thereon. Alternatively, display 214 may include a screen that does not allow a user to see through it. Further, in some aspects, display 214 may include baffles to prevent light from an outside environment from hitting eyes of the user.

XR system 200 may include, or may be in communication with, (wired or wirelessly) an input device 212. Input device 212 may include any suitable input device, such as a touchscreen, a pen or other pointer device, a keyboard, a mouse a button or key, a microphone for receiving voice commands, a gesture input device for receiving gesture commands, a video game controller, a steering wheel, a joystick, a set of buttons, a trackball, a remote control, any other input device discussed herein, or any combination thereof. In some cases, image sensor 202 may capture images that may be processed for interpreting gesture commands. For example, image sensor 202 may capture images of hands of a user and interpret hand gestures as commands.

XR system 200 may also communicate with one or more other electronic devices (wired or wirelessly). For example, communications engine 234 may be configured to manage connections and communicate with one or more electronic devices. In some cases, communications engine 234 may correspond to communication interface 1126 of FIG. 11.

In some implementations, image sensors 202, accelerometer 204, gyroscope 206, IMU 208, storage 210, display 214, compute components 216, XR engine 228, image processing engine 230, rendering engine 232, and communications engine 234 may be part of the same computing device. For example, in some cases, image sensors 202, accelerometer 204, gyroscope 206, IMU 208, storage 210, display 214, compute components 216, XR engine 228, image processing engine 230, rendering engine 232, and communications engine 234 may be integrated into an HMD, extended reality glasses (e.g., Display device 102 of FIG. 1), smartphone, laptop, tablet computer, gaming system, and/or any other computing device. In other implementations, image sensors 202, accelerometer 204, gyroscope 206, IMU 208, storage 210, display 214, compute components 216, XR engine 228, image processing engine 230, rendering engine 232 and communications engine 234 may be part of two or more separate computing devices. For instance, in some cases, some of the components 202-234 may be part of, or implemented by, one computing device and the remaining components may be part of, or implemented by, one or more other computing devices. For example, such as in a split perception XR system, XR system 200 may include a first device (e.g., an HMD such as Display device 102 of FIG. 1), including display 214, image sensor 202, accelerometer 204, gyroscope 206, IMU 208 and/or one or more compute components 216. XR system 200 may also include a second device including additional compute components 216 (e.g., companion device 104 and/or server 106 of FIG. 1). The second device may include one or more compute components 216 and may implement XR engine 228, image processing engine 230, rendering engine 232, and/or communications engine 234. In such an example, the second device may generate virtual content based on information or data (e.g., images, pose information, sensor data such as measurements from accelerometer 204, gyroscope 206, and/or IMU 208) and may provide the virtual content to the first device for display at the first device. The second device may be, or may include, a smartphone, laptop, tablet computer, personal computer, gaming system, a server computer or server device (e.g., an edge or cloud-based server, a personal computer acting as a server device, or a mobile device acting as a server device), any other computing device and/or a combination thereof.

Storage 210 may be any storage device(s) for storing data. Moreover, storage 210 may store data from any of the components of XR system 200. For example, storage 210 may store data from image sensor 202 (e.g., image or video data), data from accelerometer 204 (e.g., measurements), data from gyroscope 206 (e.g., measurements), data from IMU 208 (e.g., measurements), data from compute components 216 (e.g., processing parameters, preferences, virtual content, rendering content, scene maps, tracking and localization data, object detection data, privacy data, XR application data, face recognition data, occlusion data, etc.), data from XR engine 228, data from image processing engine 230, and/or data from rendering engine 232 (e.g., output frames). In some examples, storage 210 may include a buffer for storing frames for processing by compute components 216.

Compute components 216 may be, or may include, a central processing unit (CPU) 218, a graphics processing unit (GPU) 220, a digital signal processor (DSP) 222, an image signal processor (ISP) 224, a neural processing unit (NPU) 226, which may implement one or more trained neural networks, and/or other processors. Compute components 216 may perform various operations such as image enhancement, computer vision, graphics rendering, extended reality operations (e.g., tracking, localization, pose estimation, pose prediction, mapping, content anchoring, content rendering, predicting, etc.), image and/or video processing, sensor processing, recognition (e.g., text recognition, facial recognition, object recognition, feature recognition, tracking or pattern recognition, scene recognition, occlusion detection, etc.), trained machine-learning operations, filtering, and/or any of the various operations described herein. In some examples, compute components 216 may implement (e.g., control, operate, etc.) XR engine 228, image processing engine 230, and rendering engine 232. In other examples, compute components 216 may also implement one or more other processing engines.

Image sensor 202 may include any image and/or video sensors or capturing devices. In some examples, image sensor 202 may be part of a multiple-camera assembly, such as a dual-camera assembly. Image sensor 202 may capture image and/or video content (e.g., raw image and/or video data), which may then be processed by compute components 216, XR engine 228, image processing engine 230, and/or rendering engine 232 as described herein.

In some examples, image sensor 202 may capture image data and may generate images (also referred to as frames) based on the image data and/or may provide the image data or frames to XR engine 228, image processing engine 230, and/or rendering engine 232 for processing. An image or frame may include a video frame of a video sequence or a still image. An image or frame may include a pixel array representing a scene. For example, an image may be a red-green-blue (RGB) image having red, green, and blue color components per pixel; a luma, chroma-red, chroma-blue (YCbCr) image having a luma component and two chroma (color) components (chroma-red and chroma-blue) per pixel; or any other suitable type of color or monochrome image.

In some cases, image sensor 202 (and/or other camera of XR system 200) may be configured to also capture depth information. For example, in some implementations, image sensor 202 (and/or other camera) may include an RGB-depth (RGB-D) camera. In some cases, XR system 200 may include one or more depth sensors (not shown) that are separate from image sensor 202 (and/or other camera) and that may capture depth information. For instance, such a depth sensor may obtain depth information independently from image sensor 202. In some examples, a depth sensor may be physically installed in the same general location or position as image sensor 202 but may operate at a different frequency or frame rate from image sensor 202. In some examples, a depth sensor may take the form of a light source that may project a structured or textured light pattern, which may include one or more narrow bands of light, onto one or more objects in a scene. Depth information may then be obtained by exploiting geometrical distortions of the projected pattern caused by the surface shape of the object. In one example, depth information may be obtained from stereo sensors such as a combination of an infra-red structured light projector and an infra-red camera registered to a camera (e.g., an RGB camera).

XR system 200 may also include other sensors in its one or more sensors. The one or more sensors may include one or more accelerometers (e.g., accelerometer 204), one or more gyroscopes (e.g., gyroscope 206), one or more IMU 208, and/or other sensors. The one or more sensors may provide velocity, orientation, and/or other position-related information to compute components 216. For example, accelerometer 204 may detect acceleration by XR system 200 and may generate acceleration measurements based on the detected acceleration. In some cases, accelerometer 204 may provide one or more translational vectors (e.g., up/down, left/right, forward/back) that may be used for determining a position or pose of XR system 200. Gyroscope 206 may detect and measure the orientation and angular velocity of XR system 200. For example, gyroscope 206 may be used to measure the pitch, roll, and yaw of XR system 200. In some cases, gyroscope 206 may provide one or more rotational vectors (e.g., pitch, yaw, roll). In some examples, image sensor 202 and/or XR engine 228 may use measurements obtained by accelerometer 204 (e.g., one or more translational vectors) and/or gyroscope 206 (e.g., one or more rotational vectors) to calculate the pose of XR system 200. As previously noted, in other examples, XR system 200 may also include other sensors, such as a magnetometer, a gaze and/or eye tracking sensor, a machine vision sensor, a smart scene sensor, a speech recognition sensor, an impact sensor, a shock sensor, a position sensor, a tilt sensor, etc.

An IMU (e.g., IMU 208) is an electronic device that measures the specific force, angular rate, and/or the orientation of XR system 200, using a combination of one or more accelerometers, one or more gyroscopes, and/or one or more magnetometers. In some examples, the one or more sensors may output measured information associated with the capture of an image captured by image sensor 202 (and/or other camera of XR system 200) and/or depth information obtained using one or more depth sensors of XR system 200.

The output of one or more sensors (e.g., accelerometer 204, gyroscope 206, one or more IMUs, and/or other sensors) can be used by XR engine 228 to determine a pose of XR system 200 (also referred to as the head pose) and/or the pose of image sensor 202 (or other camera of XR system 200). In some cases, the pose of XR system 200 and the pose of image sensor 202 (or other camera) can be the same. The pose of image sensor 202 refers to the position and orientation of image sensor 202 relative to a frame of reference (e.g., with respect to a field of view 110 of FIG. 1). In some implementations, the camera pose can be determined for 6-Degrees Of Freedom (6DoF), which refers to three translational components (e.g., which can be given by X (horizontal), Y (vertical), and Z (depth) coordinates relative to a frame of reference, such as the image plane) and three angular components (e.g., roll, pitch, and yaw relative to the same frame of reference). In some implementations, the camera pose can be determined for 3-Degrees of Freedom (3DoF), which refers to the three angular components (e.g., roll, pitch, and yaw).

In some cases, a device tracker (not shown) can use the measurements from the one or more sensors and image data from image sensor 202 to track a pose (e.g., a 6DoF pose) of XR system 200. For example, the device tracker can fuse visual data (e.g., using a visual tracking solution) from the image data with inertial data from the measurements to determine a position and motion of XR system 200 relative to the physical world (e.g., the scene) and a map of the physical world. As described below, in some examples, when tracking the pose of XR system 200, the device tracker can generate a three-dimensional (3D) map of the scene (e.g., the real world) and/or generate updates for a 3D map of the scene. The 3D map updates can include, for example and without limitation, new or updated features and/or feature or landmark points associated with the scene and/or the 3D map of the scene, localization updates identifying or updating a position of XR system 200 within the scene and the 3D map of the scene, etc. The 3D map can provide a digital representation of a scene in the real/physical world. In some examples, the 3D map can anchor position-based objects and/or content to real-world coordinates and/or objects. XR system 200 can use a mapped scene (e.g., a scene in the physical world represented by, and/or associated with, a 3D map) to merge the physical and virtual worlds and/or merge virtual content or objects with the physical environment.

In some aspects, the pose of image sensor 202 and/or XR system 200 as a whole can be determined and/or tracked by compute components 216 using a visual tracking solution based on images captured by image sensor 202 (and/or other camera of XR system 200). For instance, in some examples, compute components 216 can perform tracking using computer vision-based tracking, model-based tracking, and/or simultaneous localization and mapping (SLAM) techniques. For instance, compute components 216 can perform SLAM or can be in communication (wired or wireless) with a SLAM system (not shown). SLAM refers to a class of techniques where a map of an environment (e.g., a map of an environment being modeled by XR system 200) is created while simultaneously tracking the pose of a camera (e.g., image sensor 202) and/or XR system 200 relative to that map. The map can be referred to as a SLAM map and can be three-dimensional (3D). The SLAM techniques can be performed using color or grayscale image data captured by image sensor 202 (and/or other camera of XR system 200) and can be used to generate estimates of 6DoF pose measurements of image sensor 202 and/or XR system 200. Such a SLAM technique configured to perform 6DoF tracking can be referred to as 6DoF SLAM. In some cases, the output of the one or more sensors (e.g., accelerometer 204, gyroscope 206, one or more IMUs, and/or other sensors) can be used to estimate, correct, and/or otherwise adjust the estimated pose.

In some cases, the 6DoF SLAM (e.g., 6DoF tracking) can associate features observed from certain input images from the image sensor 202 (and/or other camera) to the SLAM map. For example, 6DoF SLAM can use feature point associations from an input image to determine the pose (position and orientation) of the image sensor 202 and/or XR system 200 for the input image. 6DoF mapping can also be performed to update the SLAM map. In some cases, the SLAM map maintained using the 6DoF SLAM can contain 3D feature points triangulated from two or more images. For example, key frames can be selected from input images or a video stream to represent an observed scene. For every key frame, a respective 6DoF camera pose associated with the image can be determined. The pose of the image sensor 202 and/or the XR system 200 can be determined by projecting features from the 3D SLAM map into an image or video frame and updating the camera pose from verified 2D-3D correspondences.

In one illustrative example, the compute components 216 can extract feature points from certain input images (e.g., every input image, a subset of the input images, etc.) or from each key frame. A feature point (also referred to as a registration point) as used herein is a distinctive or identifiable part of an image, such as a part of a hand, an edge of a table, among others. Features extracted from a captured image can represent distinct feature points along three-dimensional space (e.g., coordinates on X, Y, and Z-axes), and every feature point can have an associated feature location. The feature points in key frames either match (are the same or correspond to) or fail to match the feature points of previously-captured input images or key frames. Feature detection can be used to detect the feature points. Feature detection can include an image processing operation used to examine one or more pixels of an image to determine whether a feature exists at a particular pixel. Feature detection can be used to process an entire captured image or certain portions of an image. For each image or key frame, once features have been detected, a local image patch around the feature can be extracted. Features may be extracted using any suitable technique, such as Scale Invariant Feature Transform (SIFT) (which localizes features and generates their descriptions), Learned Invariant Feature Transform (LIFT), Speed Up Robust Features (SURF), Gradient Location-Orientation histogram (GLOH), Oriented Fast and Rotated Brief (ORB), Binary Robust Invariant Scalable Keypoints (BRISK), Fast Retina Keypoint (FREAK), KAZE, Accelerated KAZE (AKAZE), Normalized Cross Correlation (NCC), descriptor matching, another suitable technique, or a combination thereof.

As one illustrative example, the compute components 216 can extract feature points corresponding to a mobile device, or the like. In some cases, feature points corresponding to the mobile device can be tracked to determine a pose of the mobile device. As described in more detail below, the pose of the mobile device can be used to determine a location for projection of AR media content that can enhance media content displayed on a display of the mobile device.

In some cases, the XR system 200 can also track the hand and/or fingers of the user to allow the user to interact with and/or control virtual content in a virtual environment. For example, the XR system 200 can track a pose and/or movement of the hand and/or fingertips of the user to identify or translate user interactions with the virtual environment. The user interactions can include, for example and without limitation, moving an item of virtual content, resizing the item of virtual content, selecting an input interface element in a virtual user interface (e.g., a virtual representation of a mobile phone, a virtual keyboard, and/or other virtual interface), providing an input through a virtual user interface, etc.

Figure 3:
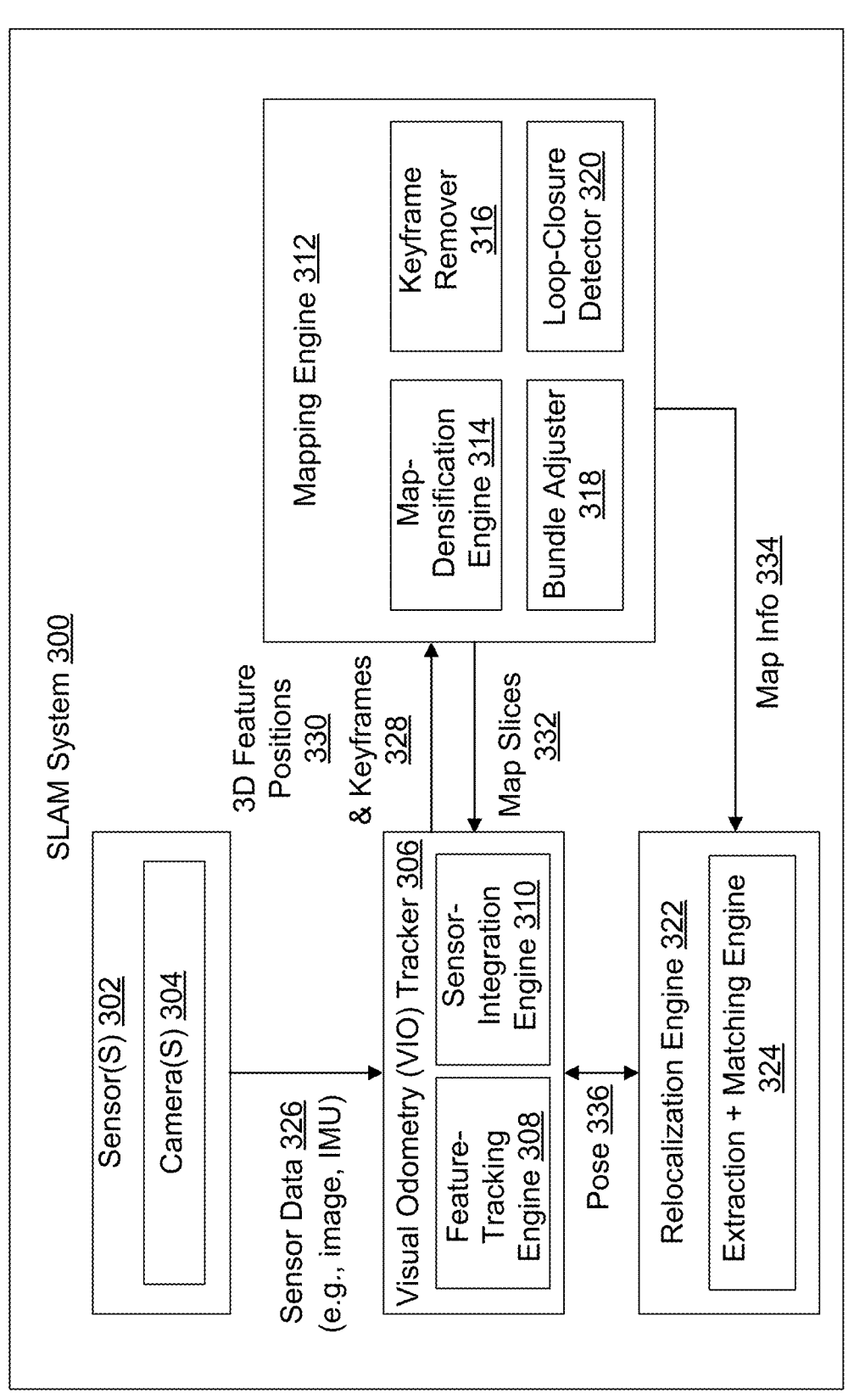
FIG. 3 is a block diagram illustrating an architecture of an example simultaneous localization and mapping (SLAM) system, according to various aspects of the present disclosure.

FIG. 3 is a block diagram illustrating an architecture of an example simultaneous localization and mapping (SLAM) system 300, according to various aspects of the present disclosure. In some aspects, SLAM system 300 can be, or can include, an extended reality (XR) system, such as XR system 100 of FIG. 1 and/or XR system 200 of FIG. 2.

SLAM system 300 of FIG. 3 includes, or is coupled to, one or more sensor(s) 302.

Sensor(s) 302 can include one or more camera(s) 304. Each of camera(s) 304 may include an image capture device, an image processing device, an image capture and processing device, another type of camera, or a combination thereof. Each of camera(s) 304 may be responsive to light from a particular spectrum of light. The spectrum of light may be a subset of the electromagnetic (EM) spectrum. For example, each of camera(s) 304 may be a visible light (VL) camera responsive to a VL spectrum, an infrared (IR) camera responsive to an IR spectrum, an ultraviolet (UV) camera responsive to a UV spectrum, a camera responsive to light from another spectrum of light from another portion of the electromagnetic spectrum, or some combination thereof.

Sensor(s) 302 can include one or more other types of sensors other than camera(s) 304, such as one or more of each of: accelerometers, gyroscopes, magnetometers, inertial measurement units (IMUs), altimeters, barometers, thermometers, radio detection and ranging (RADAR) sensors, light detection and ranging (LIDAR) sensors, sound navigation and ranging (SONAR) sensors, sound detection and ranging (SODAR) sensors, global navigation satellite system (GNSS) receivers, global positioning system (GPS) receivers, BeiDou navigation satellite system (BDS) receivers, Galileo receivers, Globalnaya Navigazionnaya Sputnikovaya Sistema (GLONASS) receivers, Navigation Indian Constellation (NavIC) receivers, Quasi-Zenith Satellite System (QZSS) receivers, Wi-Fi positioning system (WPS) receivers, cellular network positioning system receivers, Bluetooth® beacon positioning receivers, short-range wireless beacon positioning receivers, personal area network (PAN) positioning receivers, wide area network (WAN) positioning receivers, wireless local area network (WLAN) positioning receivers, other types of positioning receivers, other types of sensors discussed herein, or combinations thereof. In some examples, sensor(s) 302 can include any combination of sensors of XR system 200 of FIG. 2.

SLAM system 300 includes a visual-inertial odometry (VIO) tracker 306. The term visual-inertial odometry may also be referred to herein as visual odometry. VIO tracker 306 receives sensor data 326 from sensor(s) 302. For instance, sensor data 326 can include one or more images captured by camera(s) 304. Sensor data 326 can include other types of sensor data from camera(s) 304, such as data from any of the types of camera(s) 304 listed herein. For instance, sensor data 326 can include inertial measurement unit (IMU) data from one or more IMUs of camera(s) 304.

Upon receipt of sensor data 326 from sensor(s) 302, VIO tracker 306 performs feature detection, extraction, and/or tracking using a feature-tracking engine 308 of VIO tracker 306. For instance, where sensor data 326 includes one or more images captured by camera(s) 304 of SLAM system 300, VIO tracker 306 can identify, detect, and/or extract features in each image. Features may include visually distinctive points in an image, such as portions of the image depicting edges and/or corners. VIO tracker 306 can receive sensor data 326 periodically and/or continually from sensor(s) 302, for instance by continuing to receive more images from camera(s) 304 as camera(s) 304 capture a video, where the images are video frames of the video. VIO tracker 306 can generate descriptors for the features. Feature descriptors can be generated at least in part by generating a description of the feature as depicted in a local image patch extracted around the feature. In some examples, a feature descriptor can describe a feature as a collection of one or more feature vectors. VIO tracker 306, in some cases with mapping engine 312 and/or relocalization engine 322, can associate the plurality of features with a map of the environment based on such feature descriptors. Feature-tracking engine 308 of VIO tracker 306 can perform feature tracking by recognizing features in each image that VIO tracker 306 already previously recognized in one or more previous images, in some cases based on identifying features with matching feature descriptors in different images. Feature-tracking engine 308 can track changes in one or more positions at which the feature is depicted in each of the different images. For example, the feature extraction engine can detect a particular corner of a room depicted in a left side of a first image captured by a first camera of camera(s) 304. Feature-tracking engine 308 can detect the same feature (e.g., the same particular corner of the same room) depicted in a right side of a second image captured by the first camera. Feature-tracking engine 308 can recognize that the features detected in the first image and the second image are two depictions of the same feature (e.g., the same particular corner of the same room), and that the feature appears in two different positions in the two images. VIO tracker 306 can determine, based on the same feature appearing on the left side of the first image and on the right side of the second image that the first camera has moved, for example if the feature (e.g., the particular corner of the room) depicts a static portion of the environment.

VIO tracker 306 can include a sensor-integration engine 310. Sensor-integration engine 310 can use sensor data from other types of sensor(s) 302 (other than camera(s) 304) to determine information that can be used by feature-tracking engine 308 when performing the feature tracking. For example, sensor-integration engine 310 can receive IMU data (e.g., which can be included as part of sensor data 326) from an IMU of sensor(s) 302. Sensor-integration engine 310 can determine, based on the IMU data in sensor data 326, that SLAM system 300 has rotated 15 degrees in a clockwise direction from acquisition or capture of a first image and capture to acquisition or capture of the second image by a first camera of camera(s) 304. Based on this determination, sensor-integration engine 310 can identify that a feature depicted at a first position in the first image is expected to appear at a second position in the second image, and that the second position is expected to be located to the left of the first position by a predetermined distance (e.g., a predetermined number of pixels, inches, centimeters, millimeters, or another distance metric). Feature-tracking engine 308 can take this expectation into consideration in tracking features between the first image and the second image.

Based on the feature tracking by feature-tracking engine 308 and/or the sensor integration by sensor-integration engine 310, VIO tracker 306 can determine a 3D feature positions 330 of a particular feature. 3D feature positions 330 can include one or more 3D feature positions and can also be referred to as 3D feature points. 3D feature positions 330 can be a set of coordinates along three different axes that are perpendicular to one another, such as an X coordinate along an X axis (e.g., in a horizontal direction), a Y coordinate along a Y axis (e.g., in a vertical direction) that is perpendicular to the X axis, and a Z coordinate along a Z axis (e.g., in a depth direction) that is perpendicular to both the X axis and the Y axis. VIO tracker 306 can also determine one or more keyframes 328 (referred to hereinafter as keyframes 328) corresponding to the particular feature. A keyframe (from one or more keyframes 328) corresponding to a particular feature may be an image in which the particular feature is clearly depicted. In some examples, a keyframe (from the one or more keyframes 328) corresponding to a particular feature may be an image in which the particular feature is clearly depicted. In some examples, a keyframe corresponding to a particular feature may be an image that reduces uncertainty in 3D feature positions 330 of the particular feature when considered by feature-tracking engine 308 and/or sensor-integration engine 310 for determination of 3D feature positions 330. In some examples, a keyframe corresponding to a particular feature also includes data associated with pose 336 of SLAM system 300 and/or camera(s) 304 during capture of the keyframe. In some examples, VIO tracker 306 can send 3D feature positions 330 and/or keyframes 328 corresponding to one or more features to mapping engine 312. In some examples, VIO tracker 306 can receive map slices 332 from mapping engine 312. VIO tracker 306 can feature information within map slices 332 for feature tracking using feature-tracking engine 308.

Based on the feature tracking by feature-tracking engine 308 and/or the sensor integration by sensor-integration engine 310, VIO tracker 306 can determine a pose 336 of SLAM system 300 and/or of camera(s) 304 during capture of each of the images in sensor data 326. Pose 336 can include a location of SLAM system 300 and/or of camera(s) 304 in 3D space, such as a set of coordinates along three different axes that are perpendicular to one another (e.g., an X coordinate, a Y coordinate, and a Z coordinate). Pose 336 can include an orientation of SLAM system 300 and/or of camera(s) 304 in 3D space, such as pitch, roll, yaw, or some combination thereof. In some examples, VIO tracker 306 can send pose 336 to relocalization engine 322. In some examples, VIO tracker 306 can receive 336 from relocalization engine 322.

SLAM system 300 also includes a mapping engine 312. Mapping engine 312 generates a 3D map of the environment based on 3D feature positions 330 and/or keyframes 328 received from VIO tracker 306. Mapping engine 312 can include a map-densification engine 314, a keyframe remover 316, a bundle adjuster 318, and/or a loop-closure detector 320. Map-densification engine 314 can perform map densification, in some examples, increase the quantity and/or density of 3D coordinates describing the map geometry. Keyframe remover 316 can remove keyframes, and/or in some cases add keyframes. In some examples, keyframe remover 316 can remove keyframes 328 corresponding to a region of the map that is to be updated and/or whose corresponding confidence values are low. Bundle adjuster 318 can, in some examples, refine the 3D coordinates describing the scene geometry, parameters of relative motion, and/or optical characteristics of the image sensor used to generate the frames, according to an optimality criterion involving the corresponding image projections of all points. Loop-closure detector 320 can recognize when SLAM system 300 has returned to a previously mapped region and can use such information to update a map slice and/or reduce the uncertainty in certain 3D feature points or other points in the map geometry. Mapping engine 312 can output map slices 332 to VIO tracker 306. Map slices 332 can represent 3D portions or subsets of the map. Map slices 332 can include map slices 332 that represent new, previously-unmapped areas of the map. Map slices 332 can include map slices 332 that represent updates (or modifications or revisions) to previously-mapped areas of the map. Mapping engine 312 can output map information 334 to relocalization engine 322. Map information 334 can include at least a portion of the map generated by mapping engine 312. Map information 334 can include one or more 3D points making up the geometry of the map, such as one or more 3D feature positions 330. Map information 334 can include one or more keyframes 328 corresponding to certain features and certain 3D feature positions 330.

SLAM system 300 also includes a relocalization engine 322. Relocalization engine 322 can perform relocalization, for instance when VIO tracker 306 fail to recognize more than a threshold number of features in an image, and/or VIO tracker 306 loses track of pose 336 of SLAM system 300 within the map generated by mapping engine 312. Relocalization engine 322 can perform relocalization by performing extraction and matching using an extraction and matching engine 324. For instance, extraction and matching engine 324 can by extract features from an image captured by camera(s) 304 of SLAM system 300 while SLAM system 300 is at a current pose 336 and can match the extracted features to features depicted in different keyframes 328, identified by 3D feature positions 330, and/or identified in map information 334. By matching these extracted features to the previously-identified features, relocalization engine 322 can identify that pose 336 of SLAM system 300 is a pose 336 at which the previously-identified features are visible to camera(s) 304 of SLAM system 300 and is therefore similar to one or more previous poses 336 at which the previously-identified features were visible to camera(s) 304. In some cases, relocalization engine 322 can perform relocalization based on wide baseline mapping, or a distance between a current camera position and camera position at which feature was originally captured. Relocalization engine 322 can receive information for pose 336 from VIO tracker 306, for instance regarding one or more recent poses of SLAM system 300 and/or camera(s) 304 which relocalization engine 322 can base its relocalization determination on. Once relocalization engine 322 relocates SLAM system 300 and/or camera(s) 304 and thus determines pose 336, relocalization engine 322 can output pose 336 to VIO tracker 306.

In some examples, VIO tracker 306 can modify the image in sensor data 326 before performing feature detection, extraction, and/or tracking on the modified image. For example, VIO tracker 306 can rescale and/or resample the image. In some examples, rescaling and/or resampling the image can include downscaling, downsampling, subscaling, and/or subsampling the image one or more times. In some examples, VIO tracker 306 modifying the image can include converting the image from color to greyscale, or from color to black and white, for instance by desaturating color in the image, stripping out certain color channel(s), decreasing color depth in the image, replacing colors in the image, or a combination thereof. In some examples, VIO tracker 306 modifying the image can include VIO tracker 306 masking certain regions of the image. Dynamic objects can include objects that can have a changed appearance between one image and another. For example, dynamic objects can be objects that move within the environment, such as people, vehicles, or animals. A dynamic objects can be an object that have a changing appearance at different times, such as a display screen that may display different things at different times. A dynamic object can be an object that has a changing appearance based on the pose of camera(s) 304, such as a reflective surface, a prism, or a specular surface that reflects, refracts, and/or scatters light in different ways depending on the position of camera(s) 304 relative to the dynamic object. VIO tracker 306 can detect the dynamic objects using facial detection, facial recognition, facial tracking, object detection, object recognition, object tracking, or a combination thereof. VIO tracker 306 can detect the dynamic objects using one or more artificial intelligence algorithms, one or more trained machine learning models, one or more trained neural networks, or a combination thereof. VIO tracker 306 can mask one or more dynamic objects in the image by overlaying a mask over an area of the image that includes depiction(s) of the one or more dynamic objects. The mask can be an opaque color, such as black. The area can be a bounding box having a rectangular or other polygonal shape. The area can be determined on a pixel-by-pixel basis.

FIG. 4 is a communication flow diagram illustrating an example process 400 for processing data and displaying data, according to various aspects of the present disclosure. Process 400 may be implemented by a display device 402 and a processing device 404. Display device 402 and processing device 404 collectively may be an example of XR system 100 of FIG. 1 and/or XR system 200 of FIG. 2. In general, display device 402 may predict a pose of display device 402 for a first time based on a communication delay and/or based on processing delay and provide the predicted pose to processing device 404. Processing device 404 may then render data based on the predicted pose and provide the rendered data to display device 402. Display device 402 may then display the rendered data at a time that corresponds to the first time (e.g., based on the prediction accounting for the communication delay and/or the processing delay).

Display device 402 may determine a pose of display device 402, transmit a pose of display device 402 to processing device 404, receive data based on the pose from processing device 404, and display the data. Display device 402 may be an example of Display device 102 of FIG. 1. Additionally or alternatively, display device 402 may be an example of and/or include one or more components of XR system 200 of FIG. 2. Additionally or alternatively, display device 402 may include or implement a SLAM system 300 of FIG. 3.

Processing device 404 may receive the pose from display device 402, render data based on the pose, and transmit the pose to display device 402. Processing device 404 may be an example of companion device 104 and/or server 106 of FIG. 1. Additionally or alternatively, processing device 404 may be an example of and/or include one or more components of XR system 200 of FIG. 2.

At operation 406, display device 402 may predict a pose of display device 402. Display device 402 may predict the pose for an upcoming time. The upcoming time may be the current time plus a processing delay and/or a communication delay. The processing delay may include the time it takes for processing device 404 to process the data (e.g., at operation 410). Processing the data may include rendering the data and/or encoding the data. The processing delay may further include any time it takes for display device 402 to process the data, for example, decoding the data. The communication delay may include the time it takes for a request for data to reach processing device 404 (e.g., at operation 408) and the time it takes for data to reach display device 402 (e.g., at operation 412).

Display device 402 may predict the pose of display device 402 based on data from sensors of display device 402 (such as accelerometers e.g., accelerometer 204 of FIG. 2, gyroscopes e.g., gyroscope 206 of FIG. 2, an IMU e.g., IMU 208 of FIG. 2 and/or sensors e.g., sensor(s) 302 of FIG. 3). Additionally or alternatively, display device 402 may predict the pose of display device 402 based on images captured at display device 402 (e.g., using an image sensor such as image sensor 202 of FIG. 2 and/or camera(s) 304 of FIG. 3) using a SLAM technique.

Display device 402 may predict the pose of display device 402 using one or more machine-learning models. For example, display device 402 may include a machine-learning model that was previously trained to predict poses based on data from sensors (such as accelerometers, gyroscopes, and/or IMUs). The training process may be, or may include, an iterative backpropagation process. The training process may use a corpus of training data including poses of a device and sensor data corresponding to the poses. The corpus of training data may include many (e.g., thousands of) successive poses of a device. The training data may also include sensor data corresponding to the pose data. For example, the training data may include thousands of successive poses of the device (e.g., one pose after another) corresponding to thousands of respective times. The training data may also include sensor data captured by the device at each of the times. In an example iteration, of the iterative training process, the machine-learning model may be provided with sensor data of the training data captured at a first time. The machine-learning model may predict a pose at a second time. The second time may be after the first time (e.g., by a time that may be based on a communication delay and/or a processing delay). The predicted pose may be compared to a pose of the device at the second time from the training data. A difference (e.g., an error) may be determined between the predicted pose and the pose of the training data. Parameters (e.g., weights) of the machine-learning model may be adjusted to decrease the error in future iterations of the iterative training process. The example iteration may be repeated any number of times. After the machine-learning model is trained, the machine-learning model may be deployed in display device 402 and may be used to predict a pose of display device 402 based on sensor data of display device 402.

At operation 408, display device 402 may request data from processing device 404. The request may be based on the pose predicted at operation 406. For example, the request may include an indication of the predicted pose of display device 402. In some aspects, the request may include a timestamp (e.g., for the time at which display device 402 intends to display the data, for example, the time at which operation 408 generated the request plus the communication delay and the processing delay). In some aspects, the request may include a pose identifier, for example, an identifier that display device 402 associates with the predicted pose and/or the time at which display device 402 intends to display the data.

At operation 410, processing device 404 may process the data based on the request. For example, processing device 404 may render data based on the predicted pose. In some aspects, operation 410 may encode the rendered data (e.g., according to a video-encoding standard). Operation 410 may take some time. In some instances, operation 410 may take a number of milliseconds (ms), for example, 2 ms. After processing the data at operation 410, processing device 404 may transmit the data to display device 402 at operation 412.

At operation 414, display device 402 may display the data at a display of display device 402. In some aspects, before displaying the data display device 402 may process the data. For example, in some aspects, display device 402 may decode the data (e.g., according to the video-encoding standard used to encode the data). In some aspects, operation 414 may perform pose correction on the data. For example, operation 414 may adjust the data to correct for any discrepancy between the pose as predicted at operation 406 and the actual pose of display device 402 at the time operation 412 is received.

Process 400 may substantially repeat operation 406, operation 408, operation 410, operation 412, and operation 414 at operation 414, operation 416, operation 418, operation 420, operation 422, and operation 424 respectively. For example, at operation 416, display device 402 may predict another pose of display device 402 (e.g., for a time that is a processing delay and a communication delay after the current time, i.e., the time that display device 402 performs operation 416). The process of predicting the other pose, at operation 416, may be substantially the same as the process of predicting the pose at operation 406. At operation 418, display device 402 may request data from operation 420 based on the predicted pose. The request for data of operation 418 may be similar in form to the request of operation 408. However, the content of the request may include the pose predicted at operation 416, a timestamp based on the pose predicted at operation 416, and/or an identifier based on the pose predicted at operation 416. At operation 420, processing device 404 may process (e.g., render and encode) data based on the pose predicted at operation 416 and transmitted at operation 418. At operation 422, processing device 404 may transmit the data generated at operation 420 to processing device 404. At operation 424, display device 402 may display the data received at operation 422.

Display device 402 and processing device 404 may repeat the steps of process 400 (e.g., operation 406, operation 408, operation 410, operation 412, and operation 414) any number of times. Further, display device 402 and processing device 404 may repeat the steps at recurring intervals. For example, display device 402 and processing device 404 may repeat the steps 30, 45, or 60, times per second to generate frames for display at display device 402 at a frame rate of 30, 45, or 60 frames per second (fps).

FIG. 5 is a communication flow diagram illustrating an example process 500 for processing data and displaying data, according to various aspects of the present disclosure. Process 500 may be implemented by display device 402 and processing device 404. In general, similar to process 400 of FIG. 4, process 500 may include display device 402 predicting poses of display device 402, display device 402 transmitting the predicted poses of display device 402 to processing device 404, processing device 404 rendering data based on the predicted poses, processing device 404 transmitting the data to display device 402, and display device 402 displaying the data.

At operation 506, display device 402 may predict a pose of display device 402. Operation 506 may be the same as, or may be substantially similar to, operation 406 of process 400. At operation 508, display device 402 may transmit a request to process data (e.g., to render data and/or encode the data) to processing device 404. Operation 508 may be the same as, or may be substantially similar to, operation 408 of process 400. At operation 510, processing device 404 may process data based on the predicted pose received at operation 508. Operation 510 may begin the same as, or may be substantially similar to, operation 410 of process 400. However, unlike operation 410, operation 510 may be interrupted and may not conclude in the same way as operation 410 concludes.

At operation 526, display device 402 may determine a change in a communication characteristic between display device 402 and operation 410. The change in the communication characteristic may be, or may include, a change in latency (e.g., a change to a round-trip time (RTT) of communications between display device 402 and processing device 404) and/or a change in bandwidth (e.g., a change in a volume of data capable of being exchanged between display device 402 and processing device 404 over a duration of time). The change in the communication characteristic between display device 402 and processing device 404 may be the result of a change in how data is routed between display device 402 and processing device 404, network congestion between display device 402 and processing device 404, and/or signal quality factors affection the connection between display device 402 and operation 406.

In some aspects, display device 402 may monitor the communication characteristic between display device 402 and processing device 404. Monitoring the communication characteristic may be, or may include, timing a round-trip time (RTT) of communications between display device 402 and processing device 404. For instance, display device 402 may send a message to processing device 404 requesting a reply from processing device 404. Display device 402 may determine a time it takes to receive the reply and determine the RTT based on the time between sending the message and receiving the reply. In some cases, display device 402 may use requests for data and replies with data (e.g., a request of operation 408 of process 400 and a transmission including data of operation 414 of process 400) to monitor the communication characteristic between display device 402 and processing device 404. In such cases, display device 402 may subtract a processing delay (either based on a known processing delay time or using a timestamp from processing device 404 indicating the transmission time of the data e.g., at operation 414) to determine the RTT. In other cases, display device 402 may send separate requests and receive separate replies. Additionally or alternatively, display device 402 may monitor a bandwidth of the communicative connection between display device 402 and processing device 404, for example, by sending test packets and monitoring the time it takes the test packets to be received.

Additionally or alternatively, display device 402 may obtain information regarding the communication characteristic between display device 402 and processing device 404. For example, a network controller or manager may transmit information regarding routing information, throttling, bandwidth allocations, etc.

In some aspects, display device 402 may determine what to do in response to the change determined at operation 526 based on a degree of the change. For example, in some aspects, display device 402 may determine whether to request (at operation 528) that processing device 404 cease processing data or not based on the change in the latency. For example, if the RTT increases by a duration, and the duration exceeds a first threshold, display device 402 may determine to request (at operation 528) that processing device 404 cease processing data. However if the duration does not exceed the first threshold, display device 402 may determine not to request (at operation 528) that processing device 404 cease processing data. As another example, if the RTT decreases by a duration, and the duration exceeds a second threshold (that may be the same as the first threshold, or not), display device 402 may determine to request (at operation 528) that processing device 404 cease processing data. However if the duration does not exceed the second threshold, display device 402 may determine not to request (at operation 528) that processing device 404 cease processing data.

At operation 528, in response to determining the change in the communication characteristic (at operation 526), display device 402 may send a request that processing device 404 cease processing data. The request may include an identifier identifying the processing to be ceased. For example, the request to cease processing may include an indication of the predicted pose of display device 402 (e.g., an indication matching the indication of the predicted pose sent at operation 508). In some aspects, the request to cease processing may include a timestamp (e.g., timestamp matching the timestamp of the predicted pose sent at operation 508). In some aspects, the request may include a pose identifier (e.g., an identifier matching the identifier of the predicted pose sent at operation 508).

At operation 530, in response to receiving the request to cease processing data, processing device 404 may cease processing data. For example, processing device 404 may cease rendering data based on the predicted pose received at operation 508. In some aspects, processing device 404 may determine that processing device 404 is currently processing the data before ceasing to process the data. Additionally or alternatively, processing device 404 may confirm that the data being processed matches the data of the request to cease processing. For example, processing device 404 may verify compare the pose of the data being processed with the pose identified by the request to cease processing.

Display device 402 may transmit the request to cease processing data (at operation 528) based on a change in the communication characteristic between display device 402 and processing device 404 (determined at operation 526) that would cause the data to arrive at display device 402 too early or too late. By ceasing to process the data (at operation 530) based on the request (received at operation 528), the processing device 404 may conserve computing operations by not processing data that is destined to be too early or too late. Further, by ceasing to process data based on the request, the processing device may become available to process data sooner than if the processing device were to complete processing the data that is destined to be too early or too late. For example, processing device 404 may be available to process data based on request operation 518 sooner than processing device 404 were to continue to process the data of the request of operation 508.

In some aspects, at operation 532, processing device 404 may send a message to display device 402 indicating that processing device 404 has ceased processing data. In other cases, processing device 404 may not send such a message. In some aspects, the message sent at operation 532 may include an indication of the pose for which processing of data was cancelled. For example, the message of operation 532 may include an indication of the pose, a timestamp, and/or an identifier of the pose.

At operation 516, display device 402 may predict a pose of display device 402. Display device 402 may predict the pose based on the changed communication characteristic. For example, display device 402 may predict the pose based on the changed communication delay. For instance, display device 402 may predict the pose of display device 402 for a time that is the updated communication and the processing delay after the current time.

At operation 518, display device 402 may transmit a request to process data based on the pose predicted at operation 516 to processing device 404. In some aspects, display device 402 may predict the pose (e.g., at operation 516) prior to sending the request to cease processing data at operation 528. Further, display device 402 may send the request for data along with the request to cease processing data. For example, operation 516 may precede operation 528 and operation 518 may be performed at substantially the same time as operation 528. In such cases, because processing device 404 ceases processing the data of the request of operation 508 at operation 530, processing device 404 may be available to process the data of the request of operation 518 as soon as the request is received.

At operation 520, processing device 404 may process data based on the pose received at operation 518. Operation 520 may be the same as, or may be substantially similar to, operation 420 of process 400. At operation 522, processing device 404 may transmit data to display device 402. Operation 522 may be the same as, or may be substantially similar to, operation 422 of process 400. At operation 524, display device 402 may display the data. Operation 524 may be the same as, or may be substantially similar to, operation 424 of process 400.

Figure 6:
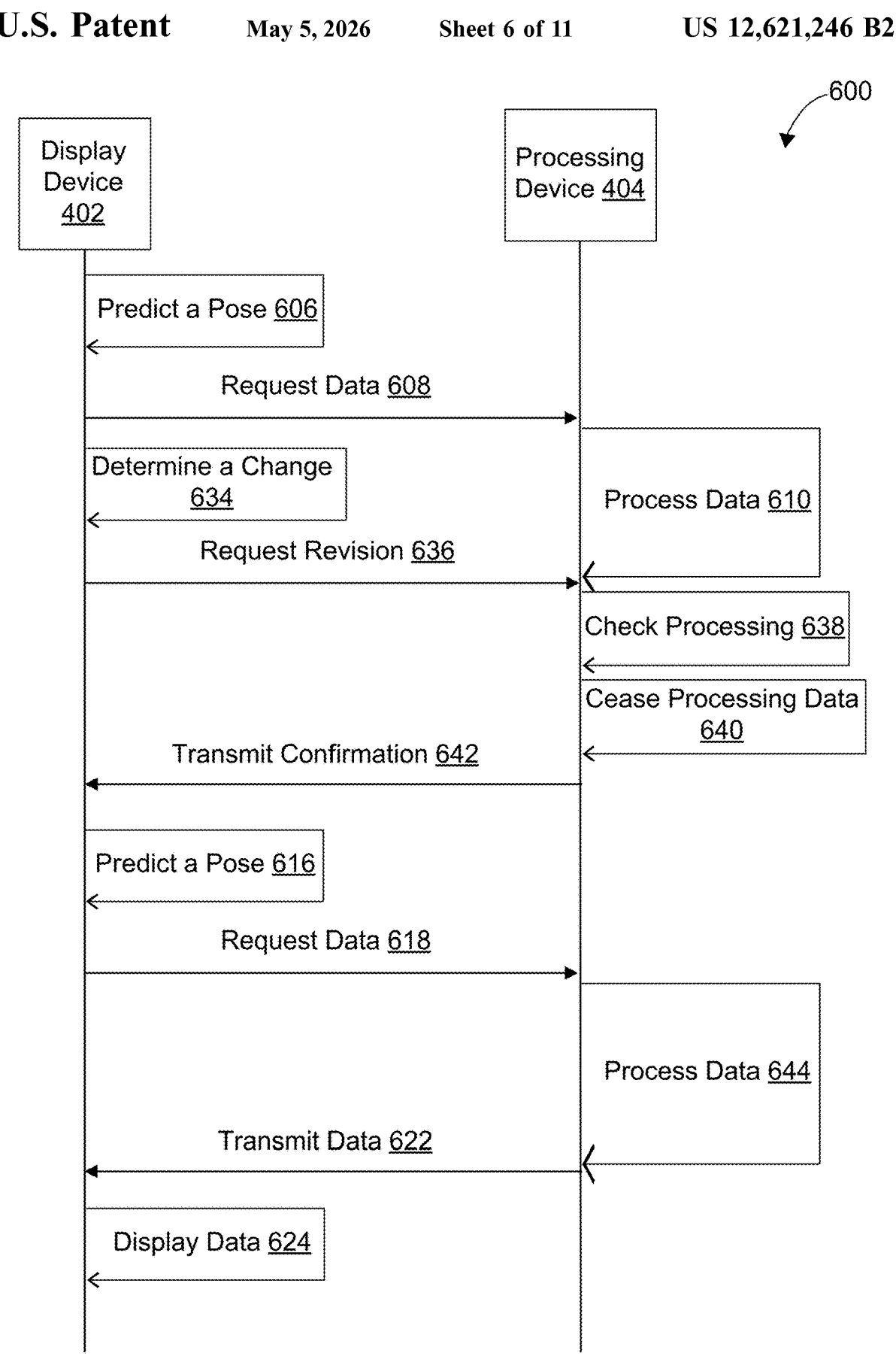
FIG. 6 is a communication flow diagram illustrating yet another process for processing data and displaying data, according to various aspects of the present disclosure.

FIG. 6 is a communication flow diagram illustrating an example process 600 for processing data and displaying data, according to various aspects of the present disclosure. Process 600 may be implemented by display device 402 and processing device 404. In general, similar to process 400 of FIG. 4 and process 500 of FIG. 5, process 600 may include display device 402 predicting poses of display device 402, display device 402 transmitting the predicted poses of display device 402 to processing device 404, processing device 404 rendering data based on the predicted poses, processing device 404 transmitting the data to display device 402, and display device 402 displaying the data.

At operation 606, display device 402 may predict a pose of display device 402. Operation 606 may be the same as, or may be substantially similar to, operation 406 of process 400. At operation 608, display device 402 may transmit a request to process data (e.g., to render data and/or encode the data) to processing device 404. Operation 608 may be the same as, or may be substantially similar to, operation 408 of process 400. At operation 610, processing device 404 may process data based on the predicted pose received at operation 608. Operation 610 may begin the same as, or may be substantially similar to, operation 410 of process 400. However, unlike operation 410, operation 610 may be interrupted and may not conclude in the same was as operation 410 concludes.

At operation 634, display device 402 may determine a change in a communication characteristic between display device 402 and operation 410. The change in the communication characteristic may be, or may include, a change in bandwidth (e.g., a change in a volume of data capable of being exchanged between display device 402 and processing device 404 over a duration of time). The change in the communication characteristic between display device 402 and processing device 404 may be the result of a change in how data is routed between display device 402 and processing device 404, network congestion between display device 402 and processing device 404, and/or signal quality factors affection the connection between display device 402 and operation 406. As described above, display device 402 may monitor the communication characteristic or be informed of the change to the communication characteristic.

In some aspects, display device 402 may determine what to do in response to the change determined at operation 634 based on a degree of the change. For example, in some aspects, display device 402 may determine whether to request (at operation 636) that processing device 404 cease revise how 404 processes data or not based on the change in the bandwidth. For example, if the bandwidth increases by an amount, and the amount exceeds a first threshold, display device 402 may determine to request (at operation 636) that processing device 404 revise how processing device 404 processes data. However if the amount does not exceed the first threshold, display device 402 may determine not to request (at operation 636) that processing device 404 revise how processing device 404 processes data. As another example, if the bandwidth decreases by an amount, and the amount exceeds a second threshold (that may be the same as the first threshold, or not), display device 402 may determine to request (at operation 636) that processing device 404 revise how processing device 404 processes data. However if the amount does not exceed the second threshold, display device 402 may determine not to request (at operation 636) that processing device 404 revise how processing device 404 processes data.

At operation 636, in response to determining the change in the communication characteristic at operation 634, display device 402 may request that processing device 404 revise how processing device 404 processes data. For example, at operation 608, display device 402 may transmit a request to processing device 404 requesting that processing device 404 revise a way that processing device 404 processes data. For instance, the request may indicate a desired change in a quality of data rendered by processing device 404. The request may be such that data rendered by processing device 404 and transmitted to display device 402 may be based on the changed communication characteristic and/or based on an expected frame rate of display device 402. For example, the request may be such that data generated by processing device 404 satisfies the expected frame rate of display device 402 (e.g., providing data frames according to the expected frame rate of display device 402) and the bandwidth of the communicative connection between display device 402 and processing device 404 (e.g., not exceeding a bandwidth allocation). For example, if display device 402 determined, at operation 634, that the bandwidth of the communicative connection between display device 402 and processing device 404 decreased, display device 402 may request that processing device 404 decrease a quality of data rendered by processing device 404, where the decreased quality may be a decrease in resolution or an increase in compression ratio. Alternatively, if display device 402 determined, at operation 634, that the bandwidth of the communicative connection between display device 402 and processing device 404 increased, display device 402 may request that processing device 404 increase a quality of data rendered by processing device 404.

At operation 638, in response to receiving the request of operation 636, processing device 404 may determine whether processing device 404 is currently processing data. At operation 640, if processing device 404 is processing data, processing device 404 may cease processing the data. In some aspects, the request of operation 636 may include a request to cease processing data. In other aspects, the request of operation 636 may not include a request or instruction regarding the ongoing processing of data. Nevertheless, processing device 404 may evaluate whether processing of data is ongoing (e.g., at operation 638) and cease any such processing (e.g., at operation 640).

If display device 402 determines (at operation 634) that the bandwidth between display device 402 and processing device 404 has decreased, display device 402 may request that processing device 404 decrease a quality of data being produced by processing device 404. If processing device 404 is processing data, processing device 404 may cease processing the data. Based on the changed bandwidth, the data being processed (at operation 610) may not be transmitted to display device 402 within the timeframe during which display device 402 expects the data, thus the data may be destined to be too late. By ceasing to process data that is destined to be too late (e.g., at operation 640), processing device 404 may conserve operations and/or be available to process data sooner.

Alternatively, if display device 402 determines (at operation 634) that the bandwidth between display device 402 and processing device 404 has increased, display device 402 may request that processing device 404 increase the quality of data being produced by processing device 404. If processing device 404 is processing data, processing device 404 may cease processing the data. Increasing the quality of the data being produced by processing device 404 may increase the size of the data transmitted by processing device 404 which may increase the bandwidth utilization. By detecting the increased bandwidth and requesting that processing device 404 increase the quality of the data, display device 402 and processing device 404 may increase a bandwidth utilization between processing device 404 and display device 402. By ceasing to process data responsive to the request to revise how data is processed, processing device 404 may spend less time processing data at the lower quality and begin processing data at the higher resolution sooner which may result in display device 402 receiving and displaying higher quality data sooner, which may be desirable for a view of display device 402.

In some aspects, at operation 642, processing device 404 may send a message to display device 402 indicating that processing device 404 has ceased processing data. In other cases, processing device 404 may not send such a message. In some aspects, the message sent at operation 642 may include an indication of the pose for which processing of data was cancelled. For example, the message of operation 642 may include an indication of the pose, a timestamp, and/or an identifier of the pose.

At operation 616, display device 402 may predict a pose of display device 402. Display device 402 may predict the pose based on the changed communication characteristic. At operation 618, display device 402 may transmit a request to process data based on the pose predicted at operation 616 to processing device 404. In some aspects, display device 402 may predict the pose (e.g., at operation 616) prior to sending the request to revise how data is processed at operation 636. Further, display device 402 may send the request for data along with the request to cease processing data. For example, operation 616 may precede operation 636 and operation 618 may be performed at substantially the same time as operation 636. In such cases, because processing device 404 ceases processing the data of the request of operation 608 at operation 638, processing device 404 may be available to process the data of the request of operation 618 as soon as the request is received.

At operation 644, processing device 404 may process data based on the pose received at operation 618. Further, processing device 404 may process the data according to the requested revisions received at operation 636. For example, if the request received at operation 636 indicates a revision to a quality of processing, processing device 404 may render the data of operation 644 at the revised quality.

At operation 622, processing device 404 may transmit data to display device 402. Operation 622 may be the same as, or may be substantially similar to, operation 422 of process 400. At operation 624, display device 402 may display the data. Operation 624 may be the same as, or may be substantially similar to, operation 424 of process 400.

FIG. 7 is a flow diagram illustrating an example process 700 for wireless communication at a device, in accordance with aspects of the present disclosure. One or more operations of process 700 may be performed by a computing device (or apparatus) or a component (e.g., a chipset, codec, etc.) of the computing device. The computing device may be a mobile device (e.g., a mobile phone), a network-connected wearable such as a watch, an extended reality (XR) device such as a virtual reality (VR) device or augmented reality (AR) device, a vehicle or component or system of a vehicle, a desktop computing device, a tablet computing device, a server computer, a robotic device, and/or any other computing device with the resource capabilities to perform the process 700. The one or more operations of process 700 may be implemented as software components that are executed and run on one or more processors.

At block 702, a computing device (or one or more components thereof) may determine a first predicted pose of the device, the first predicted pose corresponding to a first time instance. For example, display device 402 of FIG. 5 may predict a pose of display device 402, for example, at operation 506.

In some aspects, to determine the first predicted pose of the device, the computing device (or one or more components thereof) may predict the first predicted pose of the device based on at least one of: motion data from an inertial measurement unit (IMU) of the device; or a simultaneous localization and mapping (SLAM) technique based on images captured by the device. For example, display device 402 may predict a pose of display device 402 based on motion data from an IMU (e.g., IMU 208 of FIG. 2) of using a SLAM system or technique (e.g., SLAM system 300 of FIG. 3).

In some aspects, to determine the first predicted pose, the computing device (or one or more components thereof) may predict the first predicted pose of the device at the first time instance, and wherein the first time instance is after a current time. For example, display device 402 may predict a pose of display device 402 for an upcoming time.

In some aspects, the first time instance is after a current time by a duration and the duration is determined based on at least one of: a communication time between the device and the server; a rendering time associated with rendering the first data; an encoding time associated with encoding the first data; a communication time between the server and the device; or a decoding time associated with decoding the first data. For example, display device 402 may predict a pose of display device 402 for an upcoming time. The upcoming time may be after the current time by a communication time between display device 402 and processing device 404; a rendering time associated with rendering the first data; an encoding time associated with encoding the first data; a communication time between processing device 404 and display device 402; and/or a decoding time associated with decoding the first data.

At block 704, the computing device (or one or more components thereof) may cause at least one transmitter to transmit, to a server, a request to process first data based on the first predicted pose. For example, display device 402 of FIG. 5 may request that processing device 404 process first data based on the predicted pose, for example, at operation 508.

In some aspects, the request to process the first data based on the first predicted pose comprises a request to render the first data based on the first predicted pose. For example, display device 402 may transmit a request to processing device 404 that processing device 404 process image data based on the pose of display device 402 predicted at operation 506.

In some aspects, the request to process the first data may be, or may include, an indication of the first predicted pose. For example, the request transmitted at operation 508 may include an indication of the pose determined at operation 506.

In some aspects, the request to process the first data comprises at least one of: an indication of the first predicted pose; an identifier of the first predicted pose; or a timestamp indicative of the first time. For example, the request transmitted at operation 508 may include an indication of the pose determined at operation 506; an identifier of the pose predicted at operation 506; or a timestamp indicative of the first time (e.g., the time for which the pose was predicted at operation 506).

At block 706, the computing device (or one or more components thereof) may determine a change in a communication characteristic between the device and the server. For example, display device 402 of FIG. 5 may determine a change in a communication characteristic between display device 402 and processing device 404, for example, at operation 526.

At block 708, the computing device (or one or more components thereof) may cause the at least one transmitter to transmit, to the server, in response to the change in the communication characteristic, a request to cease processing the first data. For example, display device 402 may transmit a request to cease processing the first data, for example, at operation 528.

In some aspects, the request to cease processing the first data comprises at least one of: an indication of the first predicted pose; an identifier of the first predicted pose; or a timestamp indicative of the first time. For example, the request to cease processing data transmitted at operation 528 may include an indication of the pose determined at operation 506; an identifier of the pose predicted at operation 506; or a timestamp indicative of the first time (e.g., the time for which the pose was predicted at operation 506).

In some aspects, the change in the communication characteristic may be, or may include, a change in a round-trip-time (RTT) for communication between the device and the server. For example, display device 402 of FIG. 5 may, at operation 526, detect or receive an indication of a change in a RTT between display device 402 and processing device 404. In some aspects, the computing device (or one or more components thereof) may determine to transmit the request to cease processing the first data based on a duration of the change in the RTT. For example, display device 402 may determine to transmit the request to cease processing, at operation 528, based on the change in RTT determined at operation 526. In some aspects, the computing device (or one or more components thereof) may cause the at least one transmitter to transmit the request to cease processing the first data in response to: the change in the RTT comprising an increase of the RTT, wherein the increase exceeds a first threshold; or the change in the RTT comprising a decrease of the RTT, wherein the decrease exceeds a second threshold. For example, display device 402 may determine to transmit the request to cease processing, at operation 528, based on an increase of the RTT exceeding a first threshold or based on a decrease in RTT exceeding a second threshold.

In some embodiments, change in the communication characteristic may be, or may include, a change in a bandwidth for communication between the device and the server. For example, display device 402 of FIG. 5 may, at operation 526, detect or receive an indication of a change in bandwidth in the communication channel between display device 402 and processing device 404. In some aspects, the computing device (or one or more components thereof) may determine to cause the at least one transmitter to transmit the request to cease processing the first data based on a degree of the change in the bandwidth. For example, display device 402 may determine to transmit the request to cease processing, at operation 528, based on a degree of the change in bandwidth determined at operation 526. In some aspects, the computing device (or one or more components thereof) may determine to cause the at least one transmitter to transmit the request to cease processing the first data in response to: the change in the bandwidth comprising an increase of the bandwidth, wherein the increase exceeds a first threshold; or the change in the bandwidth comprising a decrease of the bandwidth, wherein the decrease exceeds a second threshold. For example, display device 402 may determine to transmit the request to cease processing, at operation 528, based on an increase of the bandwidth exceeding a first threshold or based on a decrease in bandwidth exceeding a second threshold.

In some aspects, the computing device (or one or more components thereof) may cause the at least one transmitter to transmit a request to revise how to process data at the server based on the change in the bandwidth. For example, display device 402 of FIG. 6 may, at operation 634, detect or receive an indication of a change in the communication characteristic between display device 402 and processing device 404. Further, at operation 636, display device 402 may request that processing device 404 change how processing device 404 is processing data.

In some aspects, the computing device (or one or more components thereof) may determine a second predicted pose of the device, the second predicted pose corresponding to a second time instance; and cause the at least one transmitter to transmit, to the server, a request to process second data based on the second predicted pose. For example, display device 402 of FIG. 5 may determine a pose of display device 402, for example, at operation 516. Further, display device 402 may transmit a request to process data based on the pose at operation 518.

FIG. 8 is a flow diagram illustrating an example process 800 for processing data at a server, in accordance with aspects of the present disclosure. One or more operations of process 800 may be performed by a computing device (or apparatus) or a component (e.g., a chipset, codec, etc.) of the computing device. The computing device may be a mobile device (e.g., a mobile phone), a network-connected wearable such as a watch, an extended reality (XR) device such as a virtual reality (VR) device or augmented reality (AR) device, a vehicle or component or system of a vehicle, a desktop computing device, a tablet computing device, a server computer, a robotic device, and/or any other computing device with the resource capabilities to perform the process 800. The one or more operations of process 800 may be implemented as software components that are executed and run on one or more processors.

At block 802, a computing device (or one or more components thereof) may receive, from a device, a request to process first data based on a first predicted pose of the device, the first predicted pose corresponding to a first time instance. For example, display device 402 of FIG. 5 may predict a pose of display device 402 at a first time instance, for example, at operation 506. Further, processing device 404 may receive, at operation 508, a request from display device 402 that processing device 404 process first data based on the predicted pose.

In some aspects, the request to process the first data may include an indication of the first predicted pose. For example, the request received at operation 508 may include an indication of the pose predicted at operation 506. In some aspects, the request to process the first data comprises at least one of: an indication of the first predicted pose; an identifier of the first predicted pose; or a timestamp indicative of the first time. For example, the request received at operation 508 may include an indication of the pose predicted at operation 506, an identifier of the pose predicted at operation 506, and/or a timestamp indicative of the time for which the pose was predicted.

At block 804, the computing device (or one or more components thereof) may, in response to the request to process the first data, initiate processing of the first data. For example, processing device 404 of FIG. 5 may, at operation 510, initiate processing of the data requested at operation 508.

At block 806, the computing device (or one or more components thereof) may receive, from the device, a request to cease processing the first data. For example, at operation 528, processing device 404 may receive a request to cease processing data.

In some aspects, the request to cease processing the first data comprises at least one of: an indication of the first predicted pose; an identifier of the first predicted pose; or a timestamp indicative of the first time. For example, the request received at operation 528 may include an indication of the pose predicted at operation 506, an identifier of the pose predicted at operation 506, and/or a timestamp indicative of the time for which the pose was predicted.

At block 808, the computing device (or one or more components thereof) may, in response to the request to cease processing the first data, cease processing the first data. For example, at operation 530, processing device 404 may cease processing data (e.g., the data that being processed at operation 510 as requested at operation 508).

In some aspects, the computing device (or one or more components thereof) may determine to cease processing the first data based on the request to process the first data indicating the first data and the request to cease processing the first data indicating the first data. For example, processing device 404 may determine to cease processing data, at operation 530, based on the request received at operation 528 indicating the data being processed at operation 510.

In some aspects, the computing device (or one or more components thereof) may, based on ceasing to process the first data, cause at least one transmitter to transmit a message to the device. For example, processing device 404 may, based on ceasing to process data at operation 530, transmit a confirmation at operation 532.

In some aspects, the computing device (or one or more components thereof) may receive, from the device, a request to process second data based on a second predicted pose of the device, the second predicted pose corresponding to a second time instance; in response to the request to process the second data, process the second data; and cause at least one transmitter to transmit the second data to the device. For example, at operation 516, display device 402 may predict a pose of display device 402 and send, at operation 518, a request for processing device 404 to process data based on the predicted pose. At operation 520, processing device 404 may initiate processing of the data responsive to the request and based on the predicted pose. At operation 522, processing device 404, having processed the requested data, may transmit the processed data to display device 402. In some aspects, to process the second data, the computing device (or one or more components thereof) may render the second data based on the second predicted pose. For example, processing device 404 may process, at operation 520, the second data based on the second predicted pose (as requested at operation 518). In some aspects, to process the second data, the computing device (or one or more components thereof) may render the second data based on the second predicted pose and encode the second data. For example, processing device 404 may process and encode the second data prior to transmitting the data at operation 522. In some aspects, the second data is encoded according to a video-encoding standard. For example, processing device 404 may encode the data according to a video-encoding standard.

Figure 9:
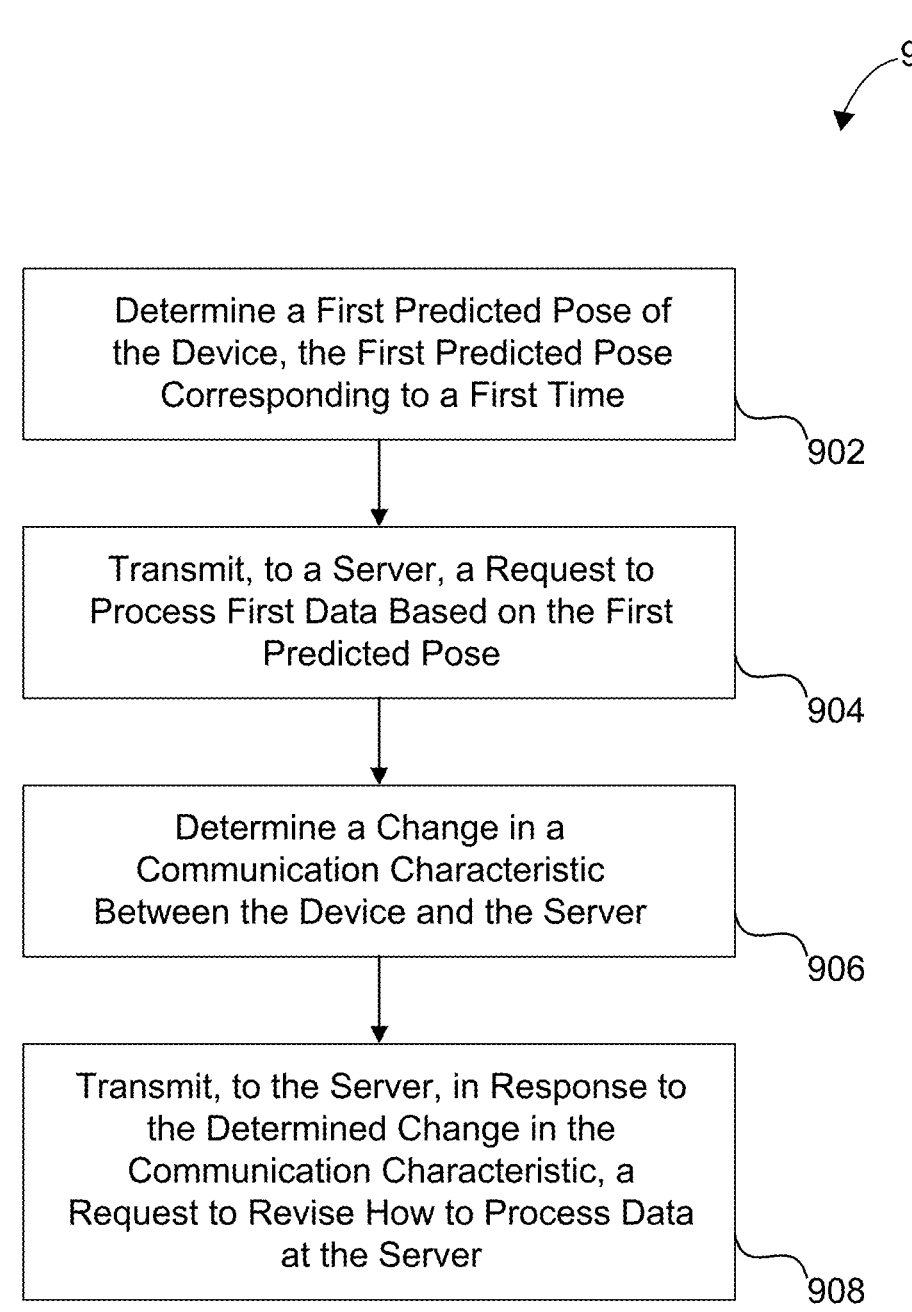
FIG. 9 is a flow diagram illustrating another example process for wireless communication at a device, in accordance with aspects of the present disclosure.

FIG. 9 is a flow diagram illustrating an example process 900 for wireless communication at a device, in accordance with aspects of the present disclosure. One or more operations of process 900 may be performed by a computing device (or apparatus) or a component (e.g., a chipset, codec, etc.) of the computing device. The computing device may be a mobile device (e.g., a mobile phone), a network-connected wearable such as a watch, an extended reality (XR) device such as a virtual reality (VR) device or augmented reality (AR) device, a vehicle or component or system of a vehicle, a desktop computing device, a tablet computing device, a server computer, a robotic device, and/or any other computing device with the resource capabilities to perform the process 900. The one or more operations of process 900 may be implemented as software components that are executed and run on one or more processors.

At block 902, a computing device (or one or more components thereof) may determine a first predicted pose of the device, the first predicted pose corresponding to a first time. For example, display device 402 of FIG. 6 may predict a pose of display device 402 at operation 606.

At block 904, the computing device (or one or more components thereof) may cause at least one transmitter to transmit, to a server, a request to process first data based on the first predicted pose. For example, display device 402 of FIG. 6, at operation 608, may transmit to process data to processing device 404.

At block 906, the computing device (or one or more components thereof) may determine a change in a communication characteristic between the device and the server. For example, display device 402 of FIG. 6 may determine, at operation 634, a change in a communication characteristic between display device 402 and processing device 404.

In some aspects, the change in the communication characteristic may be, or may include, a change in a bandwidth for communication between the device and the server. For example, display device 402 may detect, or receive an indication of, at operation 634, a change in bandwidth in a communication channel between display device 402 and processing device 404.

At block 908, the computing device (or one or more components thereof) may cause the at least one transmitter to transmit, to the server, in response to the determined change in the communication characteristic, a request to revise how to process data at the server. For example, display device 402 of FIG. 6 may transmit, at operation 636, a request to revise how processing device 404 processes data.

In some aspects, the request to revise how to process data at the server may be, or may include, a request to increase a quality for rendering data or a request to decrease the quality for rendering data. For example, the at operation 636, display device 402 may transmit a request to increase or decrease a quality of rendering data. In some aspects, in response to the change in the communication characteristic comprising an increase in a bandwidth for communication between the device and the server, the request to revise how to process data at the server comprises a request to increase a quality for rendering data; and in response to the change in the communication characteristic comprising a decrease in a bandwidth for communication between the device and the server, the request to revise how to process data at the server comprises a request to decrease a quality for rendering data. For example, if, at operation 634, display device

402 determines that a bandwidth between display device 402 and processing device 404 has increased, display device 402 may request, at operation 636, that processing device 404 increase a quality of processing data. Alternatively, if, at operation 634, display device 402 determines that a bandwidth between display device 402 and processing device 404 has decreased, display device 402 may request, at operation 636, that processing device 404 decrease a quality of processing data.

In some aspects, the computing device (or one or more components thereof) may determine a second predicted pose of the device, the second predicted pose corresponding to a second time; and cause the at least one transmitter to transmit, to the server, a request to process second data based on the second predicted pose. For example, display device 402 may predict a pose of display device 402 at operation 616. Further, at operation 618, display device 402 may transmit a request to processing device 404 for processing device 404 to process data based on the pose predicted at operation 616.

Figure 10:
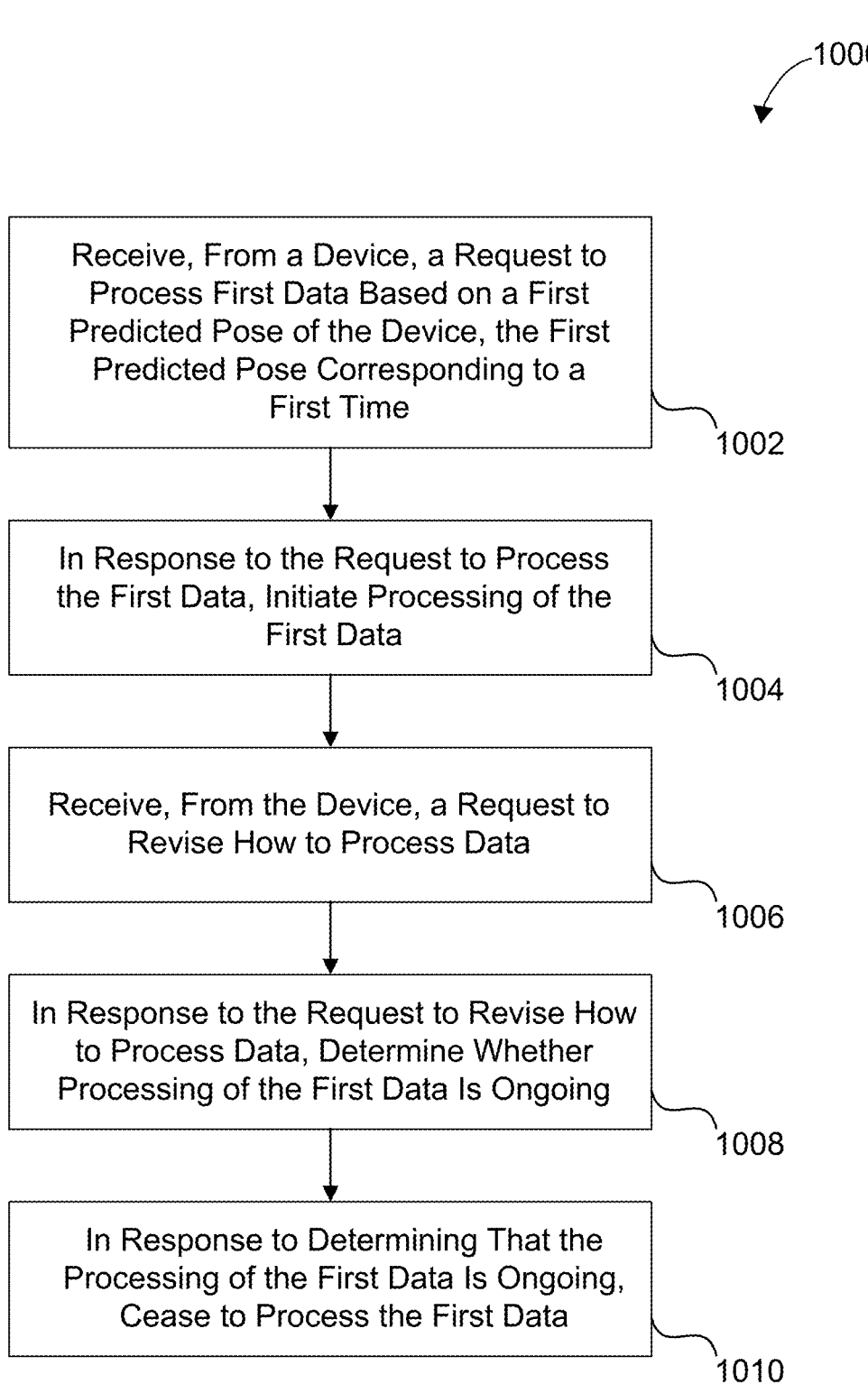
FIG. 10 is a flow diagram illustrating another process for processing data at a server, in accordance with aspects of the present disclosure.

FIG. 10 is a flow diagram illustrating an example process 1000 for processing data at a server, in accordance with aspects of the present disclosure. One or more operations of process 1000 may be performed by a computing device (or apparatus) or a component (e.g., a chipset, codec, etc.) of the computing device. The computing device may be a mobile device (e.g., a mobile phone), a network-connected wearable such as a watch, an extended reality (XR) device such as a virtual reality (VR) device or augmented reality (AR) device, a vehicle or component or system of a vehicle, a desktop computing device, a tablet computing device, a server computer, a robotic device, and/or any other computing device with the resource capabilities to perform the process 1000. The one or more operations of process 1000 may be implemented as software components that are executed and run on one or more processors.

At block 1002, a computing device (or one or more components thereof) may receive, from a device, a request to process first data based on a first predicted pose of the device, the first predicted pose corresponding to a first time. For example, at operation 606 display device 402 of FIG. 6 may predict a pose of display device 402. At operation 608, processing device 404 may receive a request from display device 402. The request may be to process data based on the pose predicted at operation 606.

At block 1004, the computing device (or one or more components thereof) may, in response to the request to process the first data, initiate processing of the first data. For example, at operation 610, processing device 404 of FIG. 6 may initiate processing data responsive to the request received at operation 608.

At block 1006, the computing device (or one or more components thereof) may receive, from the device, a request to revise how to process data. For example, at operation 636, processing device 404 may receive a request from display device 402 to revise how processing device 404 is processing data.

In some aspects, the request to revise how to process data may be, or may include, a request to increase a quality for rendering data or a request to decrease the quality for rendering data. For example, the request transmitted at operation 636 may include a request to increase or decrease a quality at which processing device 404 processes data.

At block 1008, the computing device (or one or more components thereof) may, in response to the request to revise how to process data, determine whether processing of the first data is ongoing. For example, at operation 638, processing device 404 of FIG. 6 may determine whether processing device 404 is processing data.

At block 1010, the computing device (or one or more components thereof) may, in response to determining that the processing of the first data is ongoing, cease processing of the first data. For example, in response to processing device 404 determining that processing device 404 is processing data at operation 638, processing device 404 may cease processing data at operation 640.

In some aspects, receive, from the device, a request to process second data based on a second predicted pose of the device, the second predicted pose corresponding to a second time; in response to the request to process the second data, process the second data based on the request to revise how to process data; and cause at least one transmitter to transmit the second data to the device. For example, display device 402 may determine a pose at operation 616. At operation 618, processing device 404 may receive a request to process data from display device 402. The request may be based on the pose predicted at operation 616. At operation 644, processing device 404 may process the data requested at operation 618. At operation 622, after processing the requested data, processing device 404 may transmit the requested data to display device 402.

In some aspects, to initiate processing of the first data, the computing device (or one or more components thereof) initiate processing of the first data at a first quality; and to process the second data based on the request to revise how to process data, the computing device (or one or more components thereof) may process the second data at a second quality. For example, processing device 404 may process, at operation 610, the data requested at operation 608 at a first quality and process, at operation 644, the data requested at operation 618 at a second quality.

In some examples, as noted previously, the methods described herein (e.g., process 400 of FIG. 4, process 500 of FIG. 5, process 600 of FIG. 6, process 700 of FIG. 7, process 800 of FIG. 8, process 900 of FIG. 9, process 1000 of FIG. 10, and/or other methods described herein) can be performed, in whole or in part, by a computing device or apparatus. In one example, one or more of the methods can be performed by XR system 100 of FIG. 1, display device 102 of FIG. 1, companion device 104 of FIG. 1, server 106 of FIG. 1, XR system 200 of FIG. 2, or by another system or device. In another example, one or more of the methods (e.g., process 400, process 500, process 600, process 700, process 800, process 900, process 1000, and/or other methods described herein) can be performed, in whole or in part, by the computing-device architecture 1100 shown in FIG. 11. For instance, a computing device with the computing-device architecture 1100 shown in FIG. 11 can include, or be included in, the components of XR system 100, display device 102, companion device 104, server 106, and/or XR system 200, and can implement the operations of process 400, process 500, process 600, process 700, process 800, process 900, process 1000, and/or other process described herein. In some cases, the computing device or apparatus can include various components, such as one or more input devices, one or more output devices, one or more processors, one or more microprocessors, one or more microcomputers, one or more cameras, one or more sensors, and/or other component(s) that are configured to carry out the steps of processes described herein. In some examples, the computing device can include a display, a network interface configured to communicate and/or receive the data, any combination thereof, and/or other component(s). The network interface can be configured to communicate and/or receive Internet Protocol (IP) based data or other type of data.

The components of the computing device can be implemented in circuitry. For example, the components can include and/or can be implemented using electronic circuits or other electronic hardware, which can include one or more programmable electronic circuits (e.g., microprocessors, graphics processing units (GPUs), digital signal processors (DSPs), central processing units (CPUs), and/or other suitable electronic circuits), and/or can include and/or be implemented using computer software, firmware, or any combination thereof, to perform the various operations described herein.

Process 400, process 500, process 600, process 700, process 800, process 900, process 1000, and/or other process described herein are illustrated as logical flow diagrams, the operation of which represents a sequence of operations that can be implemented in hardware, computer instructions, or a combination thereof. In the context of computer instructions, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular data types. The order in which the operations are described is not intended to be construed as a limitation, and any number of the described operations can be combined in any order and/or in parallel to implement the processes.

Additionally, process 400, process 500, process 600, process 700, process 800, process 900, process 1000, and/or other process described herein can be performed under the control of one or more computer systems configured with executable instructions and can be implemented as code (e.g., executable instructions, one or more computer programs, or one or more applications) executing collectively on one or more processors, by hardware, or combinations thereof. As noted above, the code can be stored on a computer-readable or machine-readable storage medium, for example, in the form of a computer program comprising a plurality of instructions executable by one or more processors. The computer-readable or machine-readable storage medium can be non-transitory.

Figure 11:
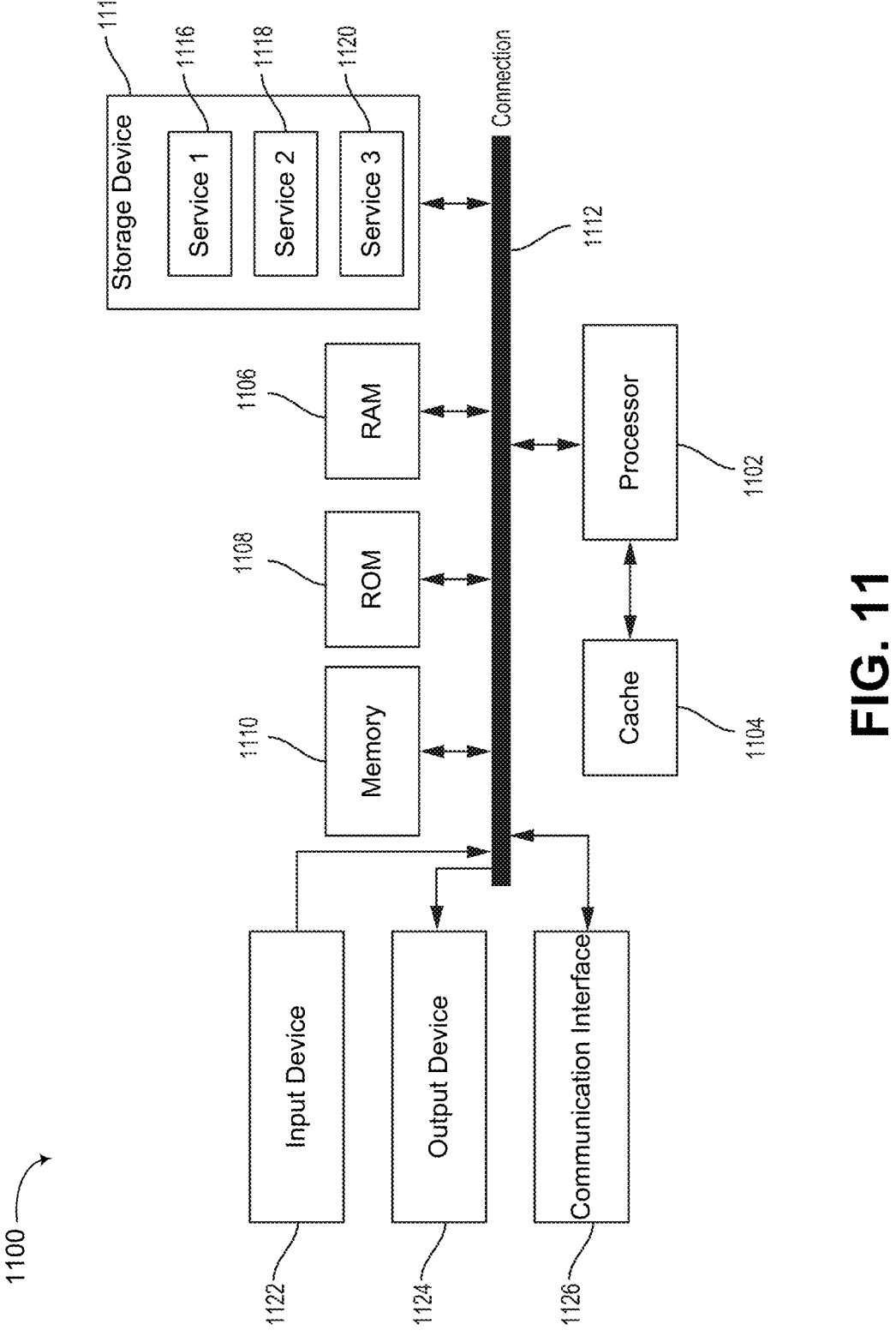
FIG. 11 is a block diagram illustrating an example computing-device architecture of an example computing device which can implement the various techniques described herein.

FIG. 11 illustrates an example computing-device architecture 1100 of an example computing device which can implement the various techniques described herein. In some examples, the computing device can include a mobile device, a wearable device, an extended reality device (e.g., a virtual reality (VR) device, an augmented reality (AR) device, or a mixed reality (MR) device), a personal computer, a laptop computer, a video server, a vehicle (or computing device of a vehicle), or other device. For example, the computing-device architecture 1100 may include, implement, or be included in any or all of XR system 100 of FIG. 1, display device 102 of FIG. 1, companion device 104 of FIG. 1, server 106 of FIG. 1, XR system 200 of FIG. 2, and/or SLAM system 300 of FIG. 3. Additionally or alternatively, computing-device architecture 1100 may be configured to perform process 400 of FIG. 4, process 500 of FIG. 5, process 600 of FIG. 6, process 700 of FIG. 7, process 800 of FIG. 8, process 900 of FIG. 9, process 1000 of FIG. 10, and/or other process described herein.

The components of computing-device architecture 1100 are shown in electrical communication with each other using connection 1112, such as a bus. The example computing-device architecture 1100 includes a processing unit (CPU or processor) 1102 and computing device connection 1112 that couples various computing device components including computing device memory 1110, such as read only memory (ROM) 1108 and random-access memory (RAM) 1106, to processor 1102.

Computing-device architecture 1100 can include a cache of high-speed memory connected directly with, in close proximity to, or integrated as part of processor 1102. Computing-device architecture 1100 can copy data from memory 1110 and/or the storage device 1114 to cache 1104 for quick access by processor 1102. In this way, the cache can provide a performance boost that avoids processor 1102 delays while waiting for data. These and other modules can control or be configured to control processor 1102 to perform various actions. Other computing device memory 1110 may be available for use as well. Memory 1110 can include multiple different types of memory with different performance characteristics. Processor 1102 can include any general-purpose processor and a hardware or software service, such as service 1 1116, service 2 1118, and service 3 1120 stored in storage device 1114, configured to control processor 1102 as well as a special-purpose processor where software instructions are incorporated into the processor design. Processor 1102 may be a self-contained system, containing multiple cores or processors, a bus, memory controller, cache, etc. A multi-core processor may be symmetric or asymmetric.

To enable user interaction with the computing-device architecture 1100, input device 1122 can represent any number of input mechanisms, such as a microphone for speech, a touch-sensitive screen for gesture or graphical input, keyboard, mouse, motion input, speech and so forth. Output device 1124 can also be one or more of a number of output mechanisms known to those of skill in the art, such as a display, projector, television, speaker device, etc. In some instances, multimodal computing devices can enable a user to provide multiple types of input to communicate with computing-device architecture 1100. Communication interface 1126 can generally govern and manage the user input and computing device output. There is no restriction on operating on any particular hardware arrangement and therefore the basic features here may easily be substituted for improved hardware or firmware arrangements as they are developed.

Storage device 1114 is a non-volatile memory and can be a hard disk or other types of computer readable media which can store data that are accessible by a computer, such as magnetic cassettes, flash memory cards, solid state memory devices, digital versatile disks, cartridges, random-access memories (RAMs) 1106, read only memory (ROM) 1108, and hybrids thereof. Storage device 1114 can include services 1116, 1118, and 1120 for controlling processor 1102. Other hardware or software modules are contemplated. Storage device 1114 can be connected to the computing device connection 1112. In one aspect, a hardware module that performs a particular function can include the software component stored in a computer-readable medium in connection with the necessary hardware components, such as processor 1102, connection 1112, output device 1124, and so forth, to carry out the function.

The term "substantially," in reference to a given parameter, property, or condition, may refer to a degree that one of ordinary skill in the art would understand that the given parameter, property, or condition is met with a small degree of variance, such as, for example, within acceptable manufacturing tolerances. By way of example, depending on the particular parameter, property, or condition that is substantially met, the parameter, property, or condition may be at least 90% met, at least 95% met, or even at least 99% met.

Aspects of the present disclosure are applicable to any suitable electronic device (such as security systems, smartphones, tablets, laptop computers, vehicles, drones, or other devices) including or coupled to one or more active depth sensing systems. While described below with respect to a device having or coupled to one light projector, aspects of the present disclosure are applicable to devices having any number of light projectors and are therefore not limited to specific devices.

The term "device" is not limited to one or a specific number of physical objects (such as one smartphone, one controller, one processing system and so on). As used herein, a device may be any electronic device with one or more parts that may implement at least some portions of this disclosure. While the below description and examples use the term "device" to describe various aspects of this disclosure, the term "device" is not limited to a specific configuration, type, or number of objects. Additionally, the term "system" is not limited to multiple components or specific aspects. For example, a system may be implemented on one or more printed circuit boards or other substrates and may have movable or static components. While the below description and examples use the term "system" to describe various aspects of this disclosure, the term "system" is not limited to a specific configuration, type, or number of objects.

Specific details are provided in the description above to provide a thorough understanding of the aspects and examples provided herein. However, it will be understood by one of ordinary skill in the art that the aspects may be practiced without these specific details. For clarity of explanation, in some instances the present technology may be presented as including individual functional blocks including functional blocks including devices, device components, steps or routines in a method embodied in software, or combinations of hardware and software. Additional components may be used other than those shown in the figures and/or described herein. For example, circuits, systems, networks, processes, and other components may be shown as components in block diagram form in order not to obscure the aspects in unnecessary detail. In other instances, well-known circuits, processes, algorithms, structures, and techniques may be shown without unnecessary detail in order to avoid obscuring the aspects.

Individual aspects may be described above as a process or method which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed but could have additional steps not included in a figure. A process may correspond to a method, a function, a procedure, a subroutine, a subprogram, etc. When a process corresponds to a function, its termination can correspond to a return of the function to the calling function or the main function.

Processes and methods according to the above-described examples can be implemented using computer-executable instructions that are stored or otherwise available from computer-readable media. Such instructions can include, for example, instructions and data which cause or otherwise configure a general-purpose computer, special purpose computer, or a processing device to perform a certain function or group of functions. Portions of computer resources used can be accessible over a network. The computer executable instructions may be, for example, binaries, intermediate format instructions such as assembly language, firmware, source code, etc.

The term "computer-readable medium" includes, but is not limited to, portable or non-portable storage devices, optical storage devices, and various other mediums capable of storing, containing, or carrying instruction(s) and/or data. A computer-readable medium may include a non-transitory medium in which data can be stored and that does not include carrier waves and/or transitory electronic signals propagating wirelessly or over wired connections. Examples of a non-transitory medium may include, but are not limited to, a magnetic disk or tape, optical storage media such as compact disk (CD) or digital versatile disk (DVD), flash memory, magnetic or optical disks, USB devices provided with non-volatile memory, networked storage devices, any suitable combination thereof, among others. A computer-readable medium may have stored thereon code and/or machine-executable instructions that may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, or the like.

In some aspects the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Devices implementing processes and methods according to these disclosures can include hardware, software, firmware, middleware, microcode, hardware description languages, or any combination thereof, and can take any of a variety of form factors. When implemented in software, firmware, middleware, or microcode, the program code or code segments to perform the necessary tasks (e.g., a computer-program product) may be stored in a computer-readable or machine-readable medium. A processor(s) may perform the necessary tasks. Typical examples of form factors include laptops, smart phones, mobile phones, tablet devices or other small form factor personal computers, personal digital assistants, rackmount devices, standalone devices, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are example means for providing the functions described in the disclosure.

In the foregoing description, aspects of the application are described with reference to specific aspects thereof, but those skilled in the art will recognize that the application is not limited thereto. Thus, while illustrative aspects of the application have been described in detail herein, it is to be understood that the inventive concepts may be otherwise variously embodied and employed, and that the appended claims are intended to be construed to include such variations, except as limited by the prior art. Various features and aspects of the above-described application may be used individually or jointly. Further, aspects can be utilized in any number of environments and applications beyond those described herein without departing from the broader spirit and scope of the specification. The specification and drawings are, accordingly, to be regarded as illustrative rather than restrictive. For the purposes of illustration, methods were described in a particular order. It should be appreciated that in alternate aspects, the methods may be performed in a different order than that described.

One of ordinary skill will appreciate that the less than ("<") and greater than (">") symbols or terminology used herein can be replaced with less than or equal to ("≤") and greater than or equal to ("≥") symbols, respectively, without departing from the scope of this description.

Where components are described as being "configured to" perform certain operations, such configuration can be accomplished, for example, by designing electronic circuits or other hardware to perform the operation, by programming programmable electronic circuits (e.g., microprocessors, or other suitable electronic circuits) to perform the operation, or any combination thereof.

The phrase "coupled to" refers to any component that is physically connected to another component either directly or indirectly, and/or any component that is in communication with another component (e.g., connected to the other component over a wired or wireless connection, and/or other suitable communication interface) either directly or indirectly.

Claim language or other language reciting "at least one of" a set and/or "one or more" of a set indicates that one member of the set or multiple members of the set (in any combination) satisfy the claim. For example, claim language reciting "at least one of A and B" or "at least one of A or B" means A, B, or A and B. In another example, claim language reciting "at least one of A, B, and C" or "at least one of A, B, or C" means A, B, C, or A and B, or A and C, or B and C, A and B and C, or any duplicate information or data (e.g., A and A, B and B, C and C, A and A and B, and so on), or any other ordering, duplication, or combination of A, B, and C. The language "at least one of" a set and/or "one or more" of a set does not limit the set to the items listed in the set. For example, claim language reciting "at least one of A and B" or "at least one of A or B" may mean A, B, or A and B, and may additionally include items not listed in the set of A and B. The phrases "at least one" and "one or more" are used interchangeably herein.

Claim language or other language reciting "at least one processor configured to," "at least one processor being configured to," "one or more processors configured to," "one or more processors being configured to," or the like indicates that one processor or multiple processors (in any combination) can perform the associated operation(s). For example, claim language reciting "at least one processor configured to: X, Y, and Z" means a single processor can be used to perform operations X, Y, and Z; or that multiple processors are each tasked with a certain subset of operations X, Y, and Z such that together the multiple processors perform X, Y, and Z; or that a group of multiple processors work together to perform operations X, Y, and Z. In another example, claim language reciting "at least one processor configured to: X, Y, and Z" can mean that any single processor may only perform at least a subset of operations X, Y, and Z.

Where reference is made to one or more elements performing functions (e.g., steps of a method), one element may perform all functions, or more than one element may collectively perform the functions. When more than one element collectively performs the functions, each function need not be performed by each of those elements (e.g., different functions may be performed by different elements) and/or each function need not be performed in whole by only one element (e.g., different elements may perform different sub-functions of a function). Similarly, where reference is made to one or more elements configured to cause another element (e.g., an apparatus) to perform functions, one element may be configured to cause the other element to perform all functions, or more than one element may collectively be configured to cause the other element to perform the functions.

Where reference is made to an entity (e.g., any entity or device described herein) performing functions or being configured to perform functions (e.g., steps of a method), the entity may be configured to cause one or more elements (individually or collectively) to perform the functions. The one or more components of the entity may include at least one memory, at least one processor, at least one communication interface, another component configured to perform one or more (or all) of the functions, and/or any combination thereof. Where reference to the entity performing functions, the entity may be configured to cause one component to perform all functions, or to cause more than one component to collectively perform the functions. When the entity is configured to cause more than one component to collectively perform the functions, each function need not be performed by each of those components (e.g., different functions may be performed by different components) and/or each function need not be performed in whole by only one component (e.g., different components may perform different sub-functions of a function).

The various illustrative logical blocks, modules, circuits, and algorithm steps described in connection with the aspects disclosed herein may be implemented as electronic hardware, computer software, firmware, or combinations thereof. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present application.

The techniques described herein may also be implemented in electronic hardware, computer software, firmware, or any combination thereof. Such techniques may be implemented in any of a variety of devices such as general-purposes computers, wireless communication device handsets, or integrated circuit devices having multiple uses including application in wireless communication device handsets and other devices. Any features described as modules or components may be implemented together in an integrated logic device or separately as discrete but interoperable logic devices. If implemented in software, the techniques may be realized at least in part by a computer-readable data storage medium including program code including instructions that, when executed, performs one or more of the methods described above. The computer-readable data storage medium may form part of a computer program product, which may include packaging materials. The computer-readable medium may include memory or data storage media, such as random-access memory (RAM) such as synchronous dynamic random-access memory (SDRAM), read-only memory (ROM), non-volatile random-access memory (NVRAM), electrically erasable programmable read-only memory (EEPROM), FLASH memory, magnetic or optical data storage media, and the like. The techniques additionally, or alternatively, may be realized at least in part by a computer-readable communication medium that carries or communicates program code in the form of instructions or data structures and that can be accessed, read, and/or executed by a computer, such as propagated signals or waves.

The program code may be executed by a processor, which may include one or more processors, such as one or more digital signal processors (DSPs), general-purpose microprocessors, an application specific integrated circuits (ASICs), field programmable logic arrays (FPGAs), or other equivalent integrated or discrete logic circuitry. Such a processor may be configured to perform any of the techniques described in this disclosure. A general-purpose processor may be a microprocessor; but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Accordingly, the term "processor," as used herein may refer to any of the foregoing structure, any combination of the foregoing structure, or any other structure or apparatus suitable for implementation of the techniques described herein.

Illustrative aspects of the disclosure include:

Aspect 1. An apparatus for wireless communication at a device, the apparatus comprising: at least one memory; and at least one processor coupled to the at least one memory and configured to: determine a first predicted pose of the device, the first predicted pose corresponding to a first time instance; cause at least one transmitter to transmit, to a server, a request to process first data based on the first predicted pose; determine a change in a communication characteristic between the device and the server; and cause the at least one transmitter to transmit, to the server, in response to the change in the communication characteristic, a request to cease processing the first data.

Aspect 2. The apparatus of aspect 1, wherein the at least one processor is further configured to: determine a second predicted pose of the device, the second predicted pose corresponding to a second time instance; and cause the at least one transmitter to transmit, to the server, a request to process second data based on the second predicted pose.

Aspect 3. The apparatus of any one of aspects 1 or 2, wherein the request to process the first data based on the first predicted pose comprises a request to render the first data based on the first predicted pose.

Aspect 4. The apparatus of any one of aspects 1 to 3, wherein, to determine the first predicted pose of the device, the at least one processor is configured to predict the first predicted pose of the device based on at least one of: motion data from an inertial measurement unit (IMU) of the device; or a simultaneous localization and mapping (SLAM) technique based on images captured by the device.

Aspect 5. The apparatus of any one of aspects 1 to 4, wherein, to determine the first predicted pose, the at least one processor is configured to predict the first predicted pose of the device at the first time instance, and wherein the first time instance is after a current time.

Aspect 6. The apparatus of aspect 5, wherein the first time instance is after a current time by a duration and wherein the duration is determined based on at least one of: a communication time between the device and the server; a rendering time associated with rendering the first data; an encoding time associated with encoding the first data; a communication time between the server and the device; or a decoding time associated with decoding the first data.

Aspect 7. The apparatus of any one of aspects 1 to 6, wherein the request to process the first data comprises an indication of the first predicted pose.

Aspect 8. The apparatus of any one of aspects 1 to 7, wherein the request to process the first data comprises at least one of: an indication of the first predicted pose; an identifier of the first predicted pose; or a timestamp indicative of the first time.

Aspect 9. The apparatus of aspect 8, wherein the request to cease processing the first data comprises at least one of: the indication of the first predicted pose; the identifier of the first predicted pose; or the timestamp indicative of the first time.

Aspect 10. The apparatus of any one of aspects 1 to 9, wherein the change in the communication characteristic comprises a change in a round-trip-time (RTT) for communication between the device and the server.

Aspect 11. The apparatus of aspect 10, wherein the at least one processor is further configured to determine to transmit the request to cease processing the first data based on a duration of the change in the RTT.

Aspect 12. The apparatus of any one of aspects 10 or 11, wherein the at least one processor is further configured to determine to cause the at least one transmitter to transmit the request to cease processing the first data in response to: the change in the RTT comprising an increase of the RTT, wherein the increase exceeds a first threshold; or the change in the RTT comprising a decrease of the RTT, wherein the decrease exceeds a second threshold.

Aspect 13. The apparatus of any one of aspects 1 to 12, wherein the change in the communication characteristic comprises a change in a bandwidth for communication between the device and the server.

Aspect 14. The apparatus of aspect 13, wherein the at least one processor is further configured to determine to cause the at least one transmitter to transmit the request to cease processing the first data based on a degree of the change in the bandwidth.

Aspect 15. The apparatus of any one of aspects 13 or 14, wherein the at least one processor is further configured to determine to cause the at least one transmitter to transmit the request to cease processing the first data in response to: the change in the bandwidth comprising an increase of the bandwidth, wherein the increase exceeds a first threshold; or the change in the bandwidth comprising a decrease of the bandwidth, wherein the decrease exceeds a second threshold.

Aspect 16. The apparatus of any one of aspects 13 to 15, wherein the at least one processor is further configured to cause the at least one transmitter to transmit a request to revise how to process data at the server based on the change in the bandwidth.

Aspect 17. An apparatus for processing data at a server, the apparatus comprising: at least one memory; and at least one processor coupled to the at least one memory and configured to: receive, from a device, a request to process first data based on a first predicted pose of the device, the first predicted pose corresponding to a first time instance; in response to the request to process the first data, initiate processing of the first data; receive, from the device, a request to cease processing the first data; and in response to the request to cease processing the first data, cease processing the first data.

Aspect 18. The apparatus of aspect 17, wherein the at least one processor is further configured to: receive, from the device, a request to process second data based on a second predicted pose of the device, the second predicted pose corresponding to a second time instance; in response to the request to process the second data, process the second data; and cause at least one transmitter to transmit the second data to the device.

Aspect 19. The apparatus of aspect 18, wherein, to process the second data, the at least one processor is configured to render the second data based on the second predicted pose.

Aspect 20. The apparatus of any one of aspects 18 or 19, wherein, to process the second data, the at least one processor is configured to render the second data based on the second predicted pose and encode the second data.

Aspect 21. The apparatus of aspect 20, wherein the second data is encoded according to a video-encoding standard.

Aspect 22. The apparatus of any one of aspects 17 to 21, wherein the request to process the first data comprises an indication of the first predicted pose.

Aspect 23. The apparatus of any one of aspects 17 to 22, wherein the request to process the first data comprises at least one of: an indication of the first predicted pose; an identifier of the first predicted pose; or a timestamp indicative of the first time.

Aspect 24. The apparatus of aspect 23, wherein the request to cease processing the first data comprises at least one of: the indication of the first predicted pose; the identifier of the first predicted pose; or the timestamp indicative of the first time.

Aspect 25. The apparatus of any one of aspects 17 to 24, wherein the at least one processor is further configured to determine to cease processing the first data based on the request to process the first data indicating the first data and the request to cease processing the first data indicating the first data.

Aspect 26. The apparatus of any one of aspects 17 to 25, wherein the at least one processor is further configured to, based on ceasing to process the first data, cause at least one transmitter to transmit a message to the device.

Aspect 27. An apparatus for wireless communication at a device, the apparatus comprising: at least one memory; and at least one processor coupled to the at least one memory and configured to: determine a first predicted pose of the device, the first predicted pose corresponding to a first time; cause at least one transmitter to transmit, to a server, a request to process first data based on the first predicted pose; determine a change in a communication characteristic between the device and the server; and cause the at least one transmitter to transmit, to the server, in response to the determined change in the communication characteristic, a request to revise how to process data at the server.

Aspect 28. The apparatus of aspect 27, wherein the at least one processor is further configured to: determine a second predicted pose of the device, the second predicted pose corresponding to a second time; and cause the at least one transmitter to transmit, to the server, a request to process second data based on the second predicted pose.

Aspect 29. The apparatus of any one of aspects 27 or 28, wherein the change in the communication characteristic comprises a change in a bandwidth for communication between the device and the server.

Aspect 30. The apparatus of any one of aspects 27 to 29, wherein the request to revise how to process data at the server comprises a request to increase a quality for rendering data or a request to decrease the quality for rendering data.

Aspect 31. The apparatus of any one of aspects 27 to 30, wherein: in response to the change in the communication characteristic comprising an increase in a bandwidth for communication between the device and the server, the request to revise how to process data at the server comprises a request to increase a quality for rendering data; and in response to the change in the communication characteristic comprising a decrease in a bandwidth for communication between the device and the server, the request to revise how to process data at the server comprises a request to decrease a quality for rendering data.

Aspect 32. An apparatus for processing data at a server, the apparatus comprising: at least one memory; and at least one processor coupled to the at least one memory and configured to: receive, from a device, a request to process first data based on a first predicted pose of the device, the first predicted pose corresponding to a first time; in response to the request to process the first data, initiate processing of the first data; receive, from the device, a request to revise how to process data; in response to the request to revise how to process data, determine whether processing of the first data is ongoing; and in response to determining that the processing of the first data is ongoing, cease processing of the first data.

Aspect 33. The apparatus of aspect 32, wherein the at least one processor is further configured to: receive, from the device, a request to process second data based on a second predicted pose of the device, the second predicted pose corresponding to a second time; in response to the request to process the second data, process the second data based on the request to revise how to process data; and cause at least one transmitter to transmit the second data to the device.

Aspect 34. The apparatus of aspect 33, wherein: to initiate processing of the first data, the at least one processor is configured to initiate processing of the first data at a first quality; and to process the second data based on the request to revise how to process data, the at least one processor is configured to process the second data at a second quality.

Aspect 35. The apparatus of any one of aspects 32 to 34, wherein the request to revise how to process data comprises a request to increase a quality for rendering data or a request to decrease the quality for rendering data.

Aspect 36. The apparatus of aspect 1, further comprising the at least one transmitter.

Aspect 37. The apparatus of aspect 27, further comprising the at least one transmitter.

Aspect 38. A method for wireless communication at a device, the method comprising: determining a first predicted pose of the device, the first predicted pose corresponding to a first time instance; transmitting, to a server, a request to process first data based on the first predicted pose; determining a change in a communication characteristic between the device and the server; and transmitting, to the server, in response to the change in the communication characteristic, a request to cease processing the first data.

Aspect 39. The method of aspect 38, further comprising: determining a second predicted pose of the device, the second predicted pose corresponding to a second time instance; and transmitting, to the server, a request to process second data based on the second predicted pose.

Aspect 40. The method of any one of aspects 38 or 39, wherein the request to process the first data based on the first predicted pose comprises a request to render the first data based on the first predicted pose.

Aspect 41. The method of any one of aspects 38 to 40, wherein determining the first predicted pose of the device comprises predicting the first predicted pose of the device based on at least one of: motion data from an inertial measurement unit (IMU) of the device; or a simultaneous localization and mapping (SLAM) technique based on images captured by the device.

Aspect 42. The method of any one of aspects 38 to 41, wherein determining the first predicted pose comprises predicting the first predicted pose of the device at the first time instance, and wherein the first time instance is after a current time.

Aspect 43. The method of aspect 42, wherein the first time instance is after a current time by a duration and wherein the duration is determined based on at least one of: a communication time between the device and the server; a rendering time associated with rendering the first data; an encoding time associated with encoding the first data; a communication time between the server and the device; or a decoding time associated with decoding the first data.

Aspect 44. The method of any one of aspects 38 to 43, wherein the request to process the first data comprises an indication of the first predicted pose.

Aspect 45. The method of any one of aspects 38 to 44, wherein the request to process the first data comprises at least one of: an indication of the first predicted pose; an identifier of the first predicted pose; or a timestamp indicative of the first time.

Aspect 46. The method of any one of aspects 38 to 45, wherein the request to cease processing the first data comprises at least one of: the indication of the first predicted pose; the identifier of the first predicted pose; or the timestamp indicative of the first time.

Aspect 47. The method of any one of aspects 38 to 46, wherein the change in the communication characteristic comprises a change in a round-trip-time (RTT) for communication between the device and the server.

Aspect 48. The method of aspect 47, further comprising determining to transmit the request to cease processing the first data based on a duration of the change in the RTT.

Aspect 49. The method of any one of aspects 47 or 48, further comprising determining to transmit the request to cease processing the first data in response to: the change in the RTT comprising an increase of the RTT, wherein the increase exceeds a first threshold; or the change in the RTT comprising a decrease of the RTT, wherein the decrease exceeds a second threshold.

Aspect 50. The method of any one of aspects 38 to 49, wherein the change in the communication characteristic comprises a change in a bandwidth for communication between the device and the server.

Aspect 51. The method of aspect 50, further comprising determining to transmit the request to cease processing the first data based on a degree of the change in the bandwidth.

Aspect 52. The method of any one of aspects 50 or 51, further comprising determining to transmit the request to cease processing the first data in response to: the change in the bandwidth comprising an increase of the bandwidth, wherein the increase exceeds a first threshold; or the change in the bandwidth comprising a decrease of the bandwidth, wherein the decrease exceeds a second threshold.

Aspect 53. The method of any one of aspects 50 to 52, further comprising transmitting a request to revise how to process data at the server based on the change in the bandwidth.

Aspect 54. A method for processing data at a server, the method comprising: receiving, from a device, a request to process first data based on a first predicted pose of the device, the first predicted pose corresponding to a first time instance; in response to the request to process the first data, initiating processing of the first data; receiving, from the device, a request to cease processing the first data; and in response to the request to cease processing the first data, ceasing to process the first data.

Aspect 55. The method of aspect 54, further comprising: receiving, from the device, a request to process second data based on a second predicted pose of the device, the second predicted pose corresponding to a second time instance; in response to the request to process the second data, processing the second data; and transmitting the second data to the device.

Aspect 56. The method of aspect 55, wherein processing the second data comprises rendering the second data based on the second predicted pose.

Aspect 57. The method of any one of aspects 55 or 56, wherein processing the second data comprises rendering the second data based on the second predicted pose and encoding the second data.

Aspect 58. The method of aspect 57, wherein the second data is encoded according to a video-encoding standard.

Aspect 59. The method of any one of aspects 54 to 58, wherein the request to process the first data comprises an indication of the first predicted pose.

Aspect 60. The method of any one of aspects 54 to 59, wherein the request to process the first data comprises at least one of: an indication of the first predicted pose; an identifier of the first predicted pose; or a timestamp indicative of the first time.

Aspect 61. The method of aspect 60, wherein the request to cease processing the first data comprises at least one of: the indication of the first predicted pose; the identifier of the first predicted pose; or the timestamp indicative of the first time.

Aspect 62. The method of any one of aspects 54 to 61, further comprising determining to cease processing the first data based on the request to process the first data indicating the first data and the request to cease processing the first data indicating the first data.

Aspect 63. The method of any one of aspects 54 to 62, further comprising, based on ceasing to process the first data, transmitting a message to the device.

Aspect 64. A method for wireless communication at a device, the method comprising: determining a first predicted pose of the device, the first predicted pose corresponding to a first time; transmitting, to a server, a request to process first data based on the first predicted pose; determining a change in a communication characteristic between the device and the server; and transmitting, to the server, in response to the determined change in the communication characteristic, a request to revise how to process data at the server.

Aspect 65. The method of aspect 64, further comprising: determining a second predicted pose of the device, the second predicted pose corresponding to a second time; and transmitting, to the server, a request to process second data based on the second predicted pose.

Aspect 66. The method of any one of aspects 64 or 65, wherein the change in the communication characteristic comprises a change in a bandwidth for communication between the device and the server.

Aspect 67. The method of any one of aspects 64 to 66, wherein the request to revise how to process data at the server comprises a request to increase a quality for rendering data or a request to decrease the quality for rendering data.

Aspect 68. The method of any one of aspects 64 to 67, wherein: in response to the change in the communication characteristic comprising an increase in a bandwidth for communication between the device and the server, the request to revise how to process data at the server comprises a request to increase a quality for rendering data; and in response to the change in the communication characteristic comprising a decrease in a bandwidth for communication between the device and the server, the request to revise how to process data at the server comprises a request to decrease a quality for rendering data.

Aspect 69. A method for processing data at a server, the method comprising: receiving, from a device, a request to process first data based on a first predicted pose of the device, the first predicted pose corresponding to a first time; in response to the request to process the first data, initiating processing of the first data; receiving, from the device, a request to revise how to process data; in response to the request to revise how to process data, determining whether processing of the first data is ongoing; and in response to determining that the processing of the first data is ongoing, ceasing to process the first data.

Aspect 70. The method of aspect 69, further comprising: receiving, from the device, a request to process second data based on a second predicted pose of the device, the second predicted pose corresponding to a second time; in response to the request to process the second data, processing the second data based on the request to revise how to process data; and transmitting the second data to the device.

Aspect 71. The method of any one of aspects 69 or 70, wherein: initiating processing of the first data comprises initiating processing of the first data at a first quality; and processing the second data based on the request to revise how to process data comprises processing the second data at a second quality.

Aspect 72. The method of any one of aspects 69 to 71, wherein the request to revise how to process data comprises a request to increase a quality for rendering data or a request to decrease the quality for rendering data.

Aspect 73. A non-transitory computer-readable storage medium having stored thereon instructions that, when executed by at least one processor, cause the at least one processor to perform operations according to any of aspects 38 to 72.

Aspect 74. An apparatus for providing virtual content for display, the apparatus comprising one or more means for perform operations according to any of aspects 38 to 72.

What is claimed is:

1. An apparatus for wireless communication at a device, the apparatus comprising:
   at least one memory; and
   at least one processor coupled to the at least one memory and configured to:
      determine a first predicted pose of the device, the first predicted pose corresponding to a first time instance;
      cause at least one transmitter to transmit, to a server, a request to render a first frame of image data based on the first predicted pose;
      determine a change in a communication characteristic between the device and the server; and
      cause the at least one transmitter to transmit, to the server, in response to the change in the communication characteristic, a request for the server to cease rendering the first frame of image data.

2. The apparatus of claim 1, wherein the at least one processor is further configured to:
   determine a second predicted pose of the device, the second predicted pose corresponding to a second time instance; and
   cause the at least one transmitter to transmit, to the server, a request to render a second frame of image data based on the second predicted pose.

3. The apparatus of claim 1, wherein, to determine the first predicted pose of the device, the at least one processor is configured to predict the first predicted pose of the device based on at least one of:
   motion data from an inertial measurement unit (IMU) of the device; or
   a simultaneous localization and mapping (SLAM) technique based on images captured by the device.

4. The apparatus of claim 1, wherein, to determine the first predicted pose, the at least one processor is configured to predict the first predicted pose of the device at the first time instance, and wherein the first time instance is after a current time.

5. The apparatus of claim 4, wherein the first time instance is after a current time by a duration and wherein the duration is determined based on at least one of:
   a communication time between the device and the server;
   a rendering time associated with rendering the first frame of image data;
   an encoding time associated with encoding the first frame of image data;
   a communication time between the server and the device; or
   a decoding time associated with decoding the first frame of image data.

6. The apparatus of claim 1, wherein the request to process the first frame of image data comprises an indication of the first predicted pose.

7. The apparatus of claim 1, wherein the request to process the first frame of image data comprises at least one of:
   an indication of the first predicted pose;
   an identifier of the first predicted pose; or
   a timestamp indicative of the first time instance.

8. The apparatus of claim 7, wherein the request to cease rendering the first frame of image data comprises at least one of:
   the indication of the first predicted pose;
   the identifier of the first predicted pose; or
   the timestamp indicative of the first time instance.

9. The apparatus of claim 1, wherein the change in the communication characteristic comprises a change in a round-trip-time (RTT) for communication between the device and the server.

10. The apparatus of claim 9, wherein the at least one processor is further configured to determine to transmit the request to cease rendering the first frame of image data based on a duration of the change in the RTT.

11. The apparatus of claim 9, wherein the at least one processor is further configured to determine to cause the at least one transmitter to transmit the request to cease rendering the first frame of image data in response to:
   the change in the RTT comprising an increase of the RTT, wherein the increase exceeds a first threshold; or
   the change in the RTT comprising a decrease of the RTT, wherein the decrease exceeds a second threshold.

12. The apparatus of claim 1, wherein the change in the communication characteristic comprises a change in a bandwidth for communication between the device and the server.

13. The apparatus of claim 12, wherein the at least one processor is further configured to determine to cause the at least one transmitter to transmit the request to cease rendering the first frame of image data based on a degree of the change in the bandwidth.

14. The apparatus of claim 12, wherein the at least one processor is further configured to determine to cause the at least one transmitter to transmit the request to cease rendering the first frame of image data in response to:
   the change in the bandwidth comprising an increase of the bandwidth, wherein the increase exceeds a first threshold; or
   the change in the bandwidth comprising a decrease of the bandwidth, wherein the decrease exceeds a second threshold.

15. The apparatus of claim 12, wherein the at least one processor is further configured to cause the at least one transmitter to transmit a request to revise how to process data at the server based on the change in the bandwidth.

16. An apparatus for processing data at a server, the apparatus comprising:
   at least one memory; and
   at least one processor coupled to the at least one memory and configured to:
      receive, from a device, a request to render a first frame of image data based on a first predicted pose of the device, the first predicted pose corresponding to a first time instance;
      in response to the request to render the first frame of image data, initiate rendering of the first frame of image data;
      receive, from the device, a request to cease rendering the first frame of image data; and
      in response to the request to cease rendering the first frame of image data, cease rendering of the first frame of image data.

17. The apparatus of claim 16, wherein the at least one processor is further configured to:

receive, from the device, a request to render a second frame of image data based on a second predicted pose of the device, the second predicted pose corresponding to a second time instance;

in response to the request to render the second frame of image data, render the second frame of image data; and cause at least one transmitter to transmit the second frame of image data to the device.

18. The apparatus of claim 17, wherein, to render the second frame of image data, the at least one processor is configured to render the second frame of image data based on the second predicted pose and encode the second frame of image data.

19. The apparatus of claim 16, wherein the request to render the first frame of image data comprises an indication of the first predicted pose.

20. The apparatus of claim 16, wherein the request to process the first frame of image data comprises at least one of:

an indication of the first predicted pose;

an identifier of the first predicted pose; or a timestamp indicative of the first time instance.

21. The apparatus of claim 20, wherein the request to cease rendering the first frame of image data comprises at least one of:

the indication of the first predicted pose;

the identifier of the first predicted pose; or the timestamp indicative of the first time instance.

22. The apparatus of claim 16, wherein the at least one processor is further configured to, based on ceasing to render the first frame of image data, cause at least one transmitter to transmit a message to the device.

23. An apparatus for wireless communication at a device, the apparatus comprising:

at least one memory; and at least one processor coupled to the at least one memory and configured to:

determine a first predicted pose of the device, the first predicted pose corresponding to a first time;

cause at least one transmitter to transmit, to a server, a request to render a first frame of image data based on the first predicted pose;

determine a change in a communication characteristic between the device and the server; and cause the at least one transmitter to transmit, to the server, in response to the determined change in the communication characteristic, a request for the server to revise how the server renders the first frame of image data.

24. The apparatus of claim 23, wherein the at least one processor is further configured to:

determine a second predicted pose of the device, the second predicted pose corresponding to a second time; and cause the at least one transmitter to transmit, to the server, a request to render a second frame of image data based on the second predicted pose.

25. The apparatus of claim 23, wherein the change in the communication characteristic comprises a change in a bandwidth for communication between the device and the server.

26. The apparatus of claim 23, wherein the request to revise how the server renders the first frame of image data comprises a request to increase a quality for rendering the first frame of image data or a request to decrease the quality for rendering the first frame of image data.

27. The apparatus of claim 23, wherein:

in response to the change in the communication characteristic comprising an increase in a bandwidth for communication between the device and the server, the request to revise how the server renders the first frame of image data comprises a request to increase a quality for rendering the first frame of image data; and in response to the change in the communication characteristic comprising a decrease in a bandwidth for communication between the device and the server, the request to revise how the server renders the first frame of image data at the server comprises a request to decrease a quality for rendering the first frame of image data.

* * * * *